(12) United States Patent
Tendolkar

(10) Patent No.: US 11,830,496 B2
(45) Date of Patent: Nov. 28, 2023

(54) GENERATING AND PROVIDING INCLUSIVITY DATA INSIGHTS FOR EVALUATING PARTICIPANTS IN A COMMUNICATION

(71) Applicant: Microsoft Technology Licensing, LLC, Redmond, WA (US)

(72) Inventor: Gaurav Vinayak Tendolkar, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 420 days.

(21) Appl. No.: 17/108,464

(22) Filed: Dec. 1, 2020

(65) Prior Publication Data

US 2022/0172723 A1 Jun. 2, 2022

(51) Int. Cl.
*G06F 16/28* (2019.01)
*G10L 15/26* (2006.01)
(Continued)

(52) U.S. Cl.
CPC ............ *G10L 15/26* (2013.01); *G06F 16/288* (2019.01); *G06Q 10/06398* (2013.01);
(Continued)

(58) Field of Classification Search
None
See application file for complete search history.

(56) References Cited

U.S. PATENT DOCUMENTS

| 8,913,103 | B1 * | 12/2014 | Sargin | .................... G06V 40/16 |
| | | | | 348/14.12 |
| 8,972,265 | B1 * | 3/2015 | Lester | .................... G10L 13/00 |
| | | | | 704/258 |

(Continued)

OTHER PUBLICATIONS

Zakaria, et al., "Markov Chain Model Development for Forecasting Air Pollution Index of Miri, Sarawak", In Journal of Sustainability, vol. 11, Issue 19, Sep. 22, 2019, pp. 1-11.
(Continued)

*Primary Examiner* — Neeraj Sharma

(57) ABSTRACT

The present disclosure relates to determining communication inclusivity amongst speakers during a user communication. Communication inclusivity is a targeted analysis that collectively evaluates speaking opportunities (provided and taken by users) during a user communication and thought completion during speech associated with the user communication. To derive communication inclusivity, a user communication is modeled as a probabilistic interaction between speakers, where a sequence of speaking states of the user communication is identified and analyzed. Non-limiting examples of speaking states comprise: active user speech; periods of silence; overlapping speakers; icon indication; questions in corresponding chat windows; combination states; other contextual signals; and any combination thereof. With these observed sequences of speaking states, a probability distribution is modeled over transitions between states to predict inclusivity of a user communication. Data insights may be generated (and provided through a graphical user interface), thereby providing analytics that help users understand the concept of communication inclusivity.

12 Claims, 5 Drawing Sheets

(51) Int. Cl.
*G06Q 10/0639* (2023.01)
*G06Q 10/109* (2023.01)
*G06Q 30/0201* (2023.01)
*G10L 15/04* (2013.01)
*G10L 15/22* (2006.01)
*G10L 25/78* (2013.01)
*G06N 20/00* (2019.01)
*H04L 67/12* (2022.01)

(52) U.S. Cl.
CPC ....... *G06Q 10/109* (2013.01); *G06Q 30/0201* (2013.01); *G10L 15/04* (2013.01); *G10L 15/22* (2013.01); *G10L 25/78* (2013.01); *G06N 20/00* (2019.01); *H04L 67/12* (2013.01)

(56) References Cited

U.S. PATENT DOCUMENTS

| | | | | |
|---|---|---|---|---|
| 10,171,908 | B1* | 1/2019 | Sinkov | G06F 40/169 |
| 2003/0074201 | A1* | 4/2003 | Grashey | G10L 17/22 |
| | | | | 704/E17.015 |
| 2004/0186712 | A1* | 9/2004 | Coles | G10L 15/26 |
| | | | | 704/235 |
| 2007/0071206 | A1* | 3/2007 | Gainsboro | H04M 3/42221 |
| | | | | 379/168 |
| 2015/0279391 | A1* | 10/2015 | Onishi | G10L 15/02 |
| | | | | 704/254 |
| 2016/0086605 | A1* | 3/2016 | Kim | H04N 7/15 |
| | | | | 348/14.03 |
| 2018/0182396 | A1* | 6/2018 | An | G10L 15/26 |
| 2018/0329998 | A1* | 11/2018 | Thomson | H04N 21/2393 |
| 2019/0147402 | A1* | 5/2019 | Sitrick | H04L 12/1822 |
| | | | | 705/301 |
| 2019/0341050 | A1 | 11/2019 | Diamant et al. | |

OTHER PUBLICATIONS

"Markov Chain", Retrieved From: https://en.wikipedia.org/wiki/Markov_chain, Retrieved on: Nov. 13, 2020, 16 Pages.

"International Search Report and Written Opinion Issued in PCT Application No. PCT/US21/058876", dated Feb. 16, 2022, 11 Pages.

* cited by examiner

100

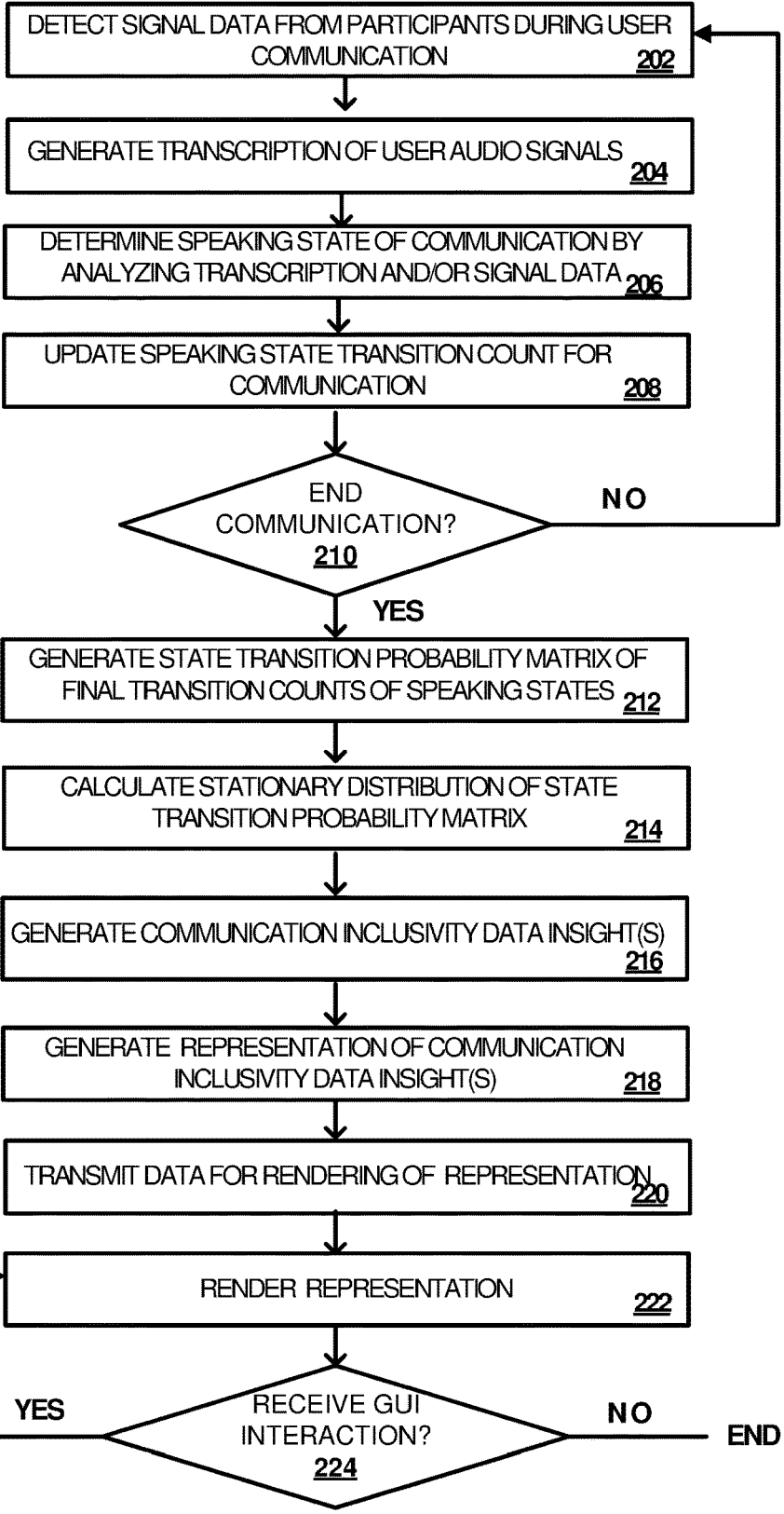

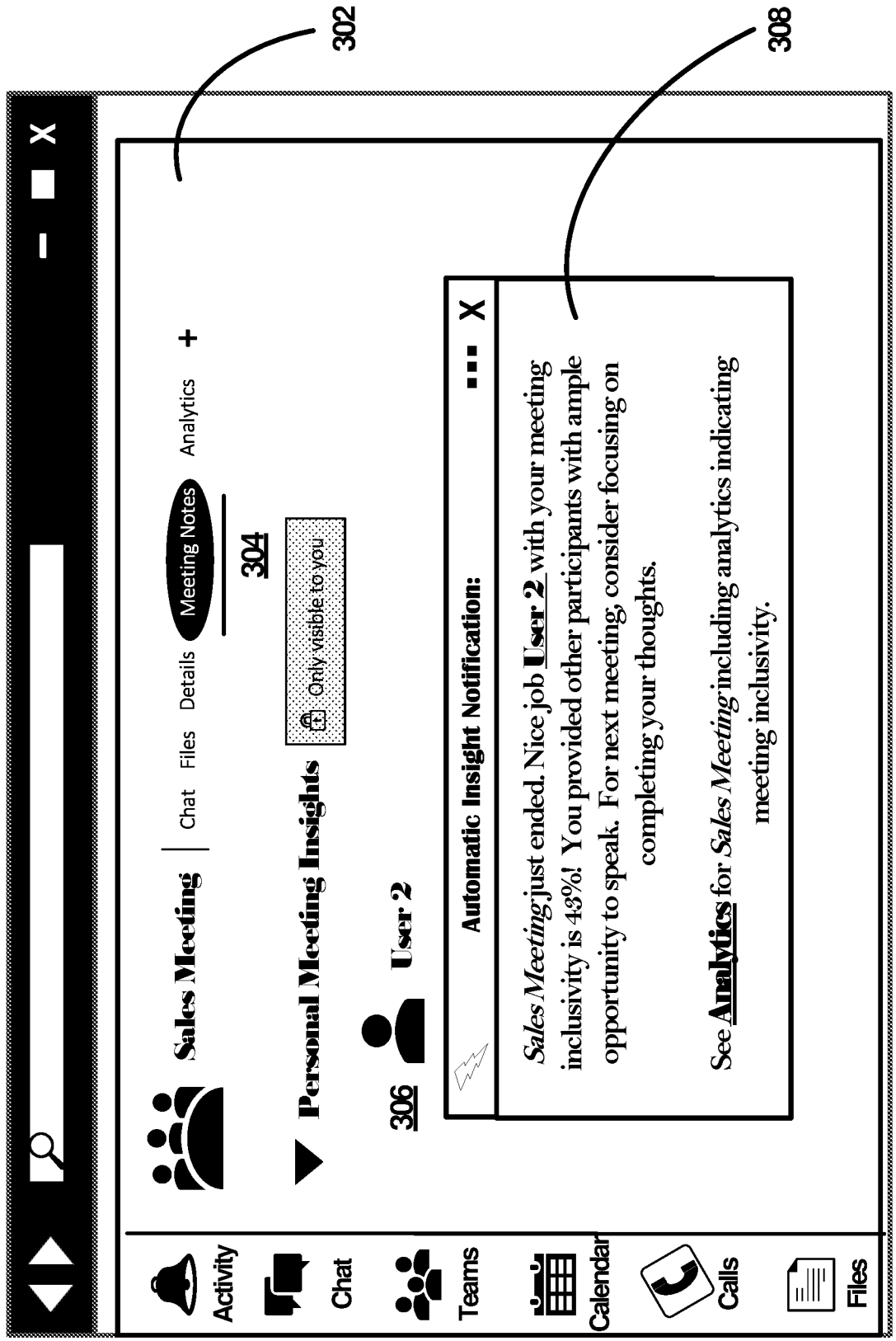

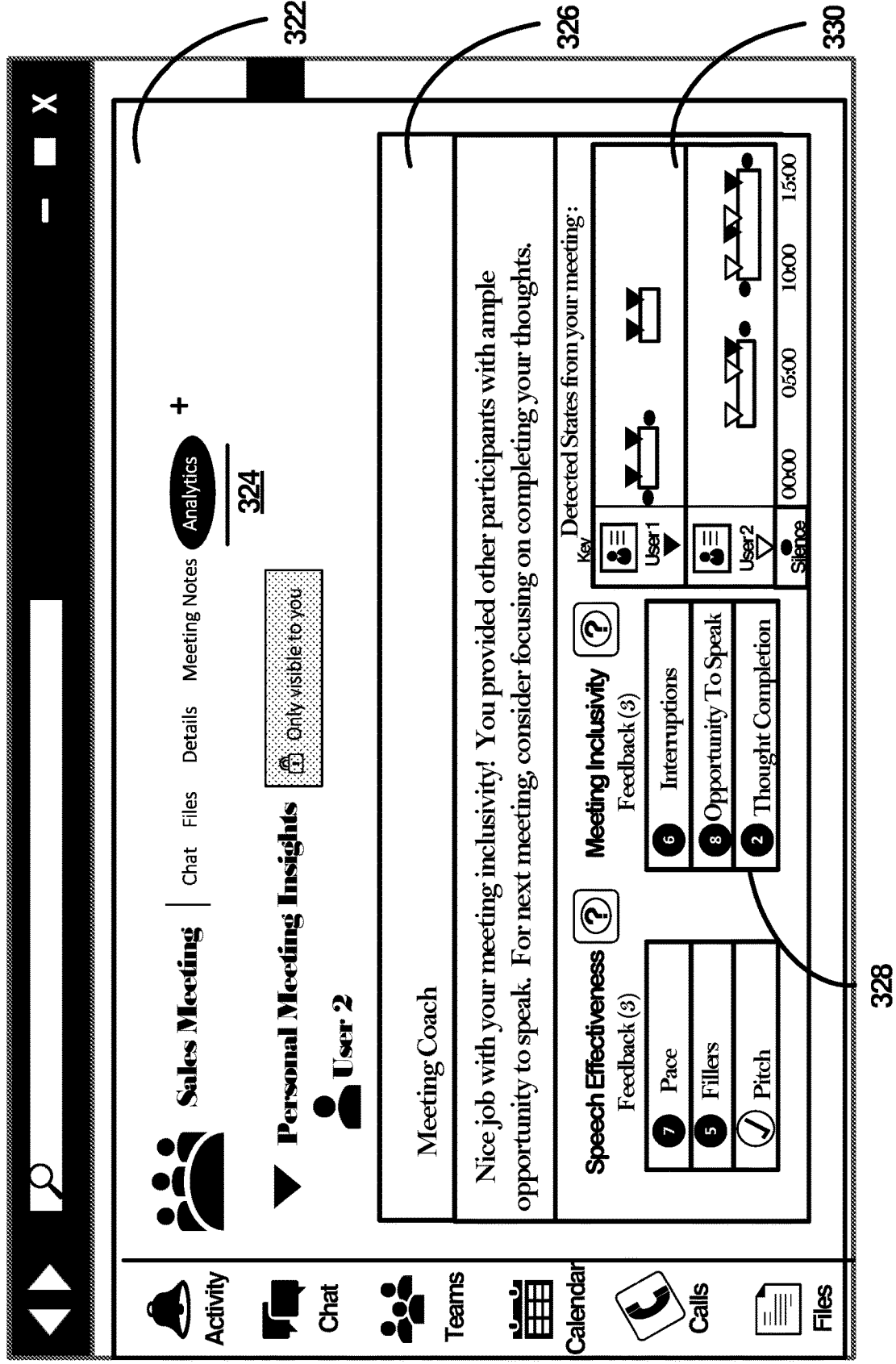

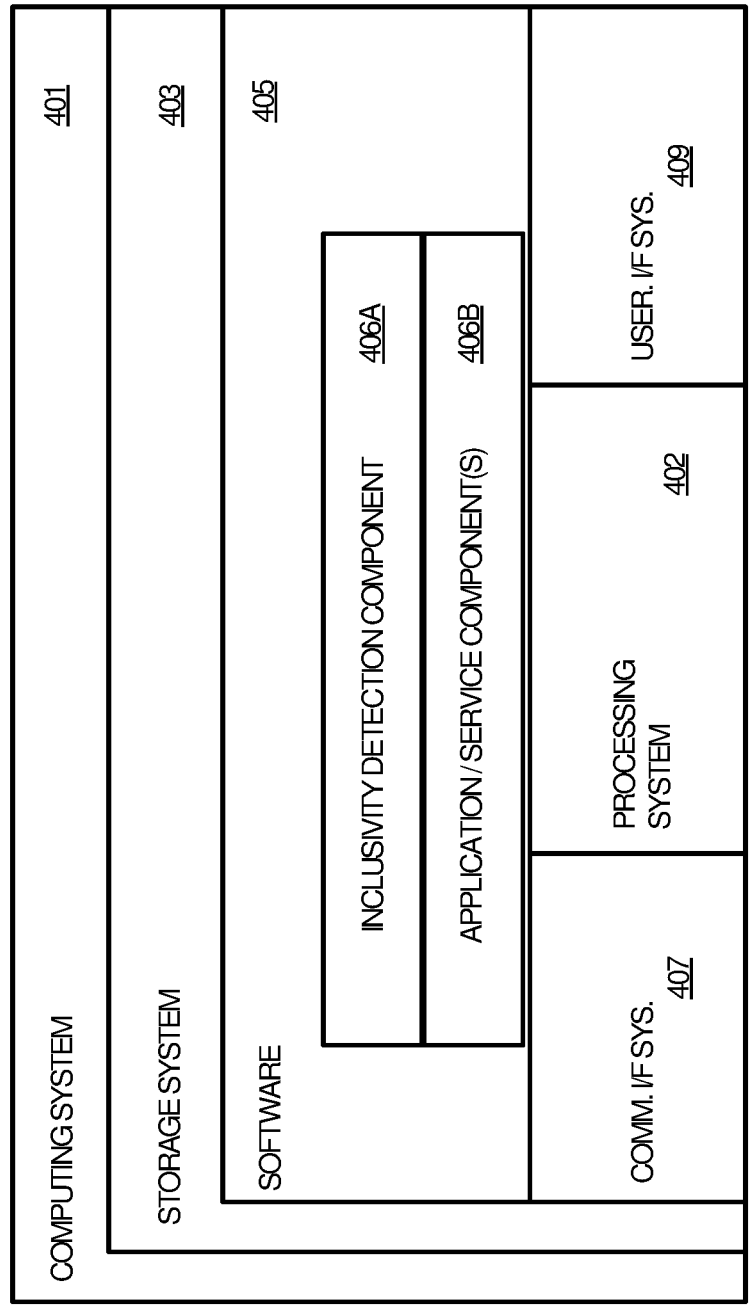

GENERATING AND PROVIDING INCLUSIVITY DATA INSIGHTS FOR EVALUATING PARTICIPANTS IN A COMMUNICATION

BACKGROUND

Virtual meetings are becoming a large part of our daily lives including how we conduct business. With participants likely being in different locations and often not having their video turned on, it is difficult for users to pick up on visual communication cues. As such, users may miss visual communication cues that may indicate to other users when they intend to speak, stop speaking, interrupt a user, ask a question, etc.

Traditional signal processing services may analyze user speech to assist with application processing including the provision of virtual meetings. For instance, user speech signals may be transcribed and analyzed. However, traditional speech analysis methods that are currently used are naïve and may only quantify metrics such as the percentage of time that each person spoke in a meeting. Those traditional analysis methods do not account for whether participants got enough opportunities to pitch in and complete their thoughts. This may often lead to less inclusive meetings, where one user may dominate the meeting leaving other participants with less of a chance to speak because information about inclusiveness is not presented to a user to help them understand their communication style and how they come across to other users.

Furthermore, another technical challenge arises in the provision of data insights to users. Insights to help users understand how they came across during a conversation as well as improve their future communication would be extremely beneficial but are typically not provided. As indicated above, traditional speech analysis methods do not analyze speech at a deeper level with an intent to determine speaking opportunities or thought completion during occurrence of a virtual meeting. This makes it difficult to ascertain how traditional computing systems would not only quantify these deeper analytical aspects to users but also generate data insights that are useful to help users better understand them.

Additional issues arise in that traditional system configurations do not typically execute a contextual analysis of user speech by considering past user communications and patterns of user speech. If you think about your next recurring meeting, your past experiences can help you imagine who would be spearheading or dominating the conversation and who would more passively listening during a call. You can imagine who is more likely to ask follow-up questions, ignore your hand raises, interrupt you, etc. However, other users may not be aware of how they come across while speaking as these types of contextual knowledge are not traditionally included in an analysis of user speech nor are any data insights automatically surfaced in real-time to help users adjust on the fly.

SUMMARY

For resolution of the above technical problems and other reasons, there is a technical need to provide solutions that generate and provide communication inclusivity data insights configured to evaluate speaking opportunities and thought completion during speech associated with a user communication.

The present disclosure relates to systems and methods for determining communication inclusivity amongst speakers during a user communication. Communication inclusivity is a targeted analysis that collectively evaluates speaking opportunities (provided and taken by users) during a user communication and thought completion during speech associated with the user communication. To derive communication inclusivity, a user communication is modeled as a probabilistic interaction between speakers, where a sequence of speaking states of the user communication is identified and analyzed. Considering each active speaker as a speaking state, a user communication may be modeled as a sequence of speaking states. Importantly, exemplary speaking states are not limited to those instances where users are actively speaking. Trained modeling may also set additional speaking for: periods of silence; overlapping speakers; icon indication (e.g., hand raises, emojis); questions in corresponding chat windows; combination states (e.g., requests/responses, interruptions, monologues); other contextual signals (e.g., past and/or present signal data including user-specific signal data, device-specific signal data, and/or application-specific signal data); and any combination thereof. This helps provide a better understanding of whether users are providing other participants with speaking opportunities, how often users are taking advantage of those speaking opportunities as well as whether users are providing complete thoughts. With these observed sequences of speaking states, a probability distribution is modeled over transitions between states to predict inclusivity of a user communication. Communication inclusivity data insights may be generated (and provided through a graphical user interface), thereby providing analytics that help users understand the concept of communication inclusivity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 illustrates an exemplary method related to generation and provision of communication inclusivity data insights for participants of a user communication, with which aspects of the present disclosure may be practiced.

FIGS. 3A-3B illustrate exemplary processing device views associated with user interface examples for an improved user interface that is configured to enable provision of representations of communication inclusivity data insights, with which aspects of the present disclosure may be practiced.

FIG. 4 illustrates a computing system suitable for implementing processing operations described herein related to automatic generation and provision of communication inclusivity data insights, with which aspects of the present disclosure may be practiced.

DETAILED DESCRIPTION

Figure 1:
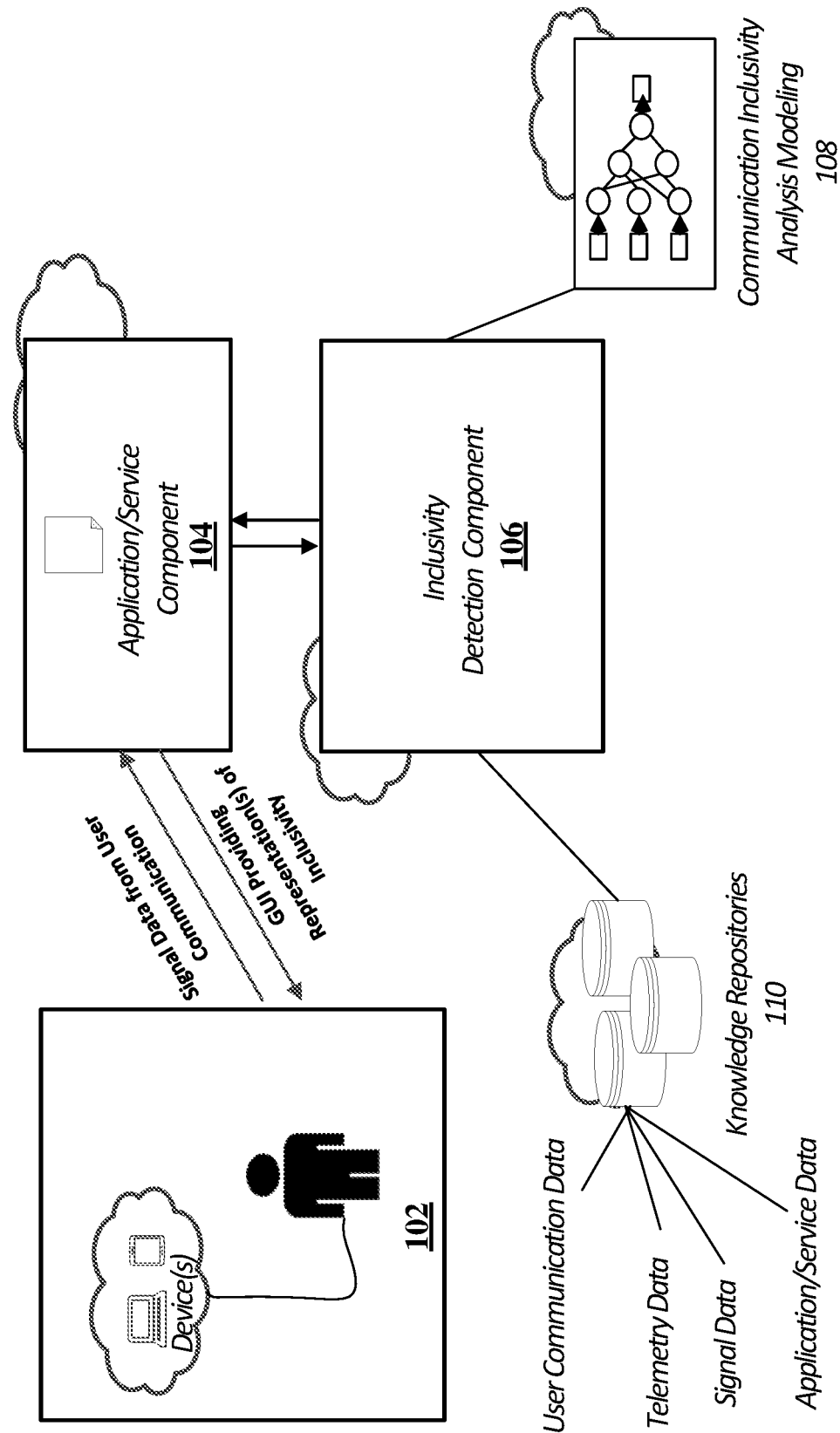
FIG. 1 illustrates an exemplary system diagram of components interfacing to enable generation and provision of communication inclusivity data insights for participants of a user communication, with which aspects of the present disclosure may be practiced.

As identified in the foregoing, the present disclosure relates to systems and methods for determining communication inclusivity amongst speakers during a user communication. Communication inclusivity is a targeted analysis that collectively evaluates speaking opportunities (provided and taken by users) during a user communication and thought completion during speech associated with the user communication. To derive communication inclusivity, a user communication is modeled as a probabilistic interaction between speakers, where a sequence of speaking states of the user communication is identified and analyzed. While the term speaking states may appear to imply that a user/participant is actively speaking, the term speaking states is intended to cover any state relative to a user including states where users take action (e.g., actively speaking or providing an indication) as well as states where no action is taken (e.g., state of silence). The term speaking states is fitting because a user is making a conscious choice as to whether to provide an action or refrain from the same and thus is speaking to its state of mind with each choice that is made.

Considering each active speaker as a speaking state, a user communication may be modeled as a sequence of speaking states. Importantly, exemplary speaking states are not limited to those instances where users are actively speaking. In addition to active speaking states, trained modeling may also set additional speaking for: periods of silence; overlapping speakers; icon indication (e.g., hand raises, emojis); questions in corresponding chat windows; combination states (e.g., requests/responses, interruptions, monologues); other contextual signals (e.g., past and/or present signal data including user-specific signal data, device-specific signal data, and/or application-specific signal data); and any combination thereof. This helps provide a better understanding of whether users are providing other participants with speaking opportunities, how often users are taking advantage of those speaking opportunities as well as whether users are providing complete thoughts. With these observed sequences of speaking states, a probability distribution is modeled over transitions between states to predict inclusivity of a user communication.

As previously indicated, communication inclusivity comprises an evaluation of signal data (e.g., audio signals and/or other contextual signal data) that is discretized as speaking states during a user communication. A user communication is a technical instance where at least one user is involved in a conversation. Such technical instances comprise collaborative communications between multiple users such as electronic meetings (e.g., remote meeting) or a conversation over an electronic medium (e.g., messaging, email, channel of a collaborative application/service). User communications as defined herein further extend to technical instances where a user is conducting a conversation with a software application/service (e.g., one that provides a chatbot) that simulates dialogue of a conversation or other examples where only one user is providing dialogue. Results of processing described in the present disclosure may be provided at any temporal point relative to the execution of a user communication without departing from the spirit of the present disclosure. Among other technical instances, communication inclusivity data insights described herein may be provided in real-time (or near real-time) during occurrence of a user communication, directly after completion of a user communication (or at a predetermined time period after a completion of an instance of a user communication), and/or prior to the occurrence of a reoccurring user communication (e.g., reoccurring electronic meeting).

In additional to the novel manner which signal data is discretized as exemplary speaking states, the present disclosure further describes application of an algorithm that analyzes transitions between those discretized speaking states to generate communication inclusivity determinations and data insights. An exemplary algorithm treats a user communication as a Markov chain, observing the sequence of speaking states as a user communication progresses to completion. Developers may set any number of speaking states as a state of the Markov chain. For example, during an electronic meeting, active speaking states of users may be tracked and counted along with states of silence. Other types of speaking states previously listed can further be incorporated into this analysis to provide a more comprehensive analysis of communication inclusivity.

At the end of a user communication, the algorithm is configured to build a state transition probability matrix (e.g., stochastic matrix) based on the observed sequence of states (e.g., sequence of speakers/silences). Proofs may then be applied to prove that a sequence of speaking states of a user communication (and thus the state transition probability matrix thereof) is irreducible and aperiodic. Confirming that the state transition probability matrix is stochastic, irreducible and aperiodic, proves that the meeting has a stationary distribution. In other words, in a long enough meeting with a given transition matrix, the expected time a participant will speak, will follow a unique stationary distribution. A state transition probability matrix may provide observed probabilities of who speaks after who during the electronic meeting, and the stationary distribution represents how much time each participant will end up speaking if we were to simulate this meeting multiple times or run a single meeting infinitely. A determination as to aspects of communication inclusivity can be derived from a generated stationary distribution based on the novel construction of the state transition probability matrix. Consider an analysis of a stationary distribution that is concentrated on a specific user (participant A) rather than other participants. This may mean that in a future similar user communication (e.g., same participants, same agenda) or even in the representation of current meeting in participants' minds, participant A spoke most of the time (dominating the communication) and ultimately giving other participants less chance to state their points.

Moreover, an exemplary algorithm is further configured to dive deeper into inclusivity analysis to generate determinations as to any of a plurality of other aspects associated with communication inclusivity. As identified above, communication inclusivity is a targeted analysis that collectively evaluates speaking opportunities (provided and taken by users) during a user communication and thought completion during speech associated with the user communication. In additional to an overall inclusivity evaluation (e.g., for a user or group of users), inclusivity analytics pertaining to a users' thought completion and opportunities provided (and taken) by that user may be generated to help users better understand communication inclusivity. Non-limiting examples of inclusivity analytics comprise but are not limited to: an analytic as to thought completion by a user during a user communication; an analytic pertaining to interruptions by the user during the user communication; an analytic pertaining to interruptions by other users during the user communication;

an analytic pertaining to opportunities to speak during the user communication; an analytic pertaining to opportunities to speak that were taken by the user during the user communication; an analytic indicating user monologuing during the user communication; analytics related to speech effectiveness (e.g., pace, use of fillers, pitch) during the user communication, among other examples. Inclusivity analytics may be a quantifiable determination (e.g., numeric value or rank) or a qualitative determination (e.g., good, bad, inclusive/not inclusive, textual summary of the analysis) that is output in a representation of communication inclusivity data insights.

Inclusivity analytics referenced above may be derived from analysis of any of the following: the stationary distribution; evaluation of a subset of specific speaking state transitions detected during a user communication; probabilities associated with the state transition probability matrix (including threshold evaluation of speaking states and associated transitions); collected signal data as described herein; or a combination of any of the foregoing. In one example, an inclusivity analytic pertaining to evaluation of the speaking opportunities provided/taken by a user may be derived from analysis of the quantified values associated with the stationary distribution. In another example, an inclusivity analytic for thought completion may be derived from an analysis (e.g., count) of specific state transitions during a user communication such as transitions from a state of active speech (by the user) which transition directly to a state of silence. In further examples, any of the inclusivity analytics generated may further be comparatively evaluated with signal data collected for a user (or other users) from past user communications. This type of analysis may help provide a user with an overall understanding of their communication inclusivity, communication style and effectiveness over one or more user communications.

A further point of novelty of the present disclosure relates to the provision of an improved graphical user interface (GUI) that is configured to enable rendering of novel GUI representations that present communication inclusivity data insights. An inclusivity detection service of the present disclosure may be utilized to automatically generate tangible GUI representations from results of inclusivity analysis of a user communication, thereby helping users understand the concept of communication inclusivity. Exemplary communication inclusivity data insights may be tailored for representation as user-specific data insights (e.g., specific to an individual user or comparative with a group of users) and/or group-specific data insights (e.g., specific to a group of users for one or more user communications). In examples where group-specific data insights are provided, the present disclosure may provide data insights that inclusively evaluate a group of users involved in a user communication and/or data insights comparatively evaluating a group of users involved in a user communication with one or more other groups of users (e.g., associated with another user communication). Non-limiting examples of GUI representations of the present disclosure are provided in FIGS. 3A and 3B. In an example where a user communication is an electronic meeting, an improved GUI may provide meeting diagnostics and potential coaching tips from ingested meeting content of the electronic meeting which may help improve a users' communication. For example, a summary report of a user communication (e.g., electronic meeting) may comprise communication inclusivity data insights previously described including specific inclusivity analytics derived from communication inclusivity analysis.

Exemplary technical advantages provided by processing described in the present disclosure comprise but are not limited to: generation of exemplary speaking states that contextually analyze a user communication at a deeper level as compared with traditional analysis methods; application of a novel algorithm configured to automate processing for analyzing communication inclusivity; automated generation of communication inclusivity data insights; automated generation of representations of communication inclusivity data insights; an improved GUI provided through an application or service that is configured to provide representations of communication inclusivity data insights; applicability of trained artificial intelligence (AI) processing that is specifically configured to aid processing for generation of communication inclusivity determinations; improved quality in the level of insights provided for a user communication; improved processing efficiency (e.g., reduction in processing cycles, saving resources/bandwidth) for computing devices when analyzing a user communication and generating data insights therefrom; reduction in latency during in provision of communication inclusivity data insights during or after a user communication; and interoperability to enable components described herein to interface with any type of application/service for comprehensive analysis of a user communication provided therethrough, among other technical advantages.

FIG. 1 illustrates an exemplary system diagram 100 of components interfacing to enable generation and provision of communication inclusivity data insights for participants of a user communication, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in method 200 (FIG. 2) as well as processing described in and associated with visual diagrams of FIGS. 3A-3B and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software data platform (e.g., distributed software platform) that also provides, to a component, access to and knowledge of other components that are associated with applications/services. In one instance, processing operations described in system diagram 100 may be implemented by one or more components connected over a distributed network, where a user account may be working with a specific profile established through a distributed software platform. System diagram 100 comprises user computing devices 102; an application/service component 104; an inclusivity detection component 106; communication inclusivity analysis modeling 108; and knowledge repositories 110.

System diagram 100 comprises user computing device(s) 102. An example of a user computing device 102 is a computing system (or computing systems) as described in the description of FIG. 4. User computing device(s) 102 are intended to cover examples where a computing device is a client computing device that is executing an application or service to conduct a user communication. As an example, a user may be conducting an electronic meeting through a collaborative communication application or service, where a GUI is provided for the electronic meeting, through the collaborative communication or service, including representations of communication inclusivity data insights. In alternative examples, the user computing device(s) 102 is also intended to cover examples of computing devices that developers (e.g., users) utilize to review processing specific to detecting communication inclusivity and generating communication inclusivity data insights therefrom including update of an exemplary algorithm and/or trained AI processing.

An exemplary application/service component 104 is configured to provide data for an exemplary application/service. The designation application/service is intended to cover any examples where an application or service is provided. Applications or services, provided through the application/service component 104, may be any type of programmed software. Examples described herein are intended to work with any type of productivity application or service. A productivity application or service is configured for execution of tasks including the management of user communications. In some examples, productivity applications/services may be utilized to enable users to conduct user communications therethrough. In other examples, productivity applications/services may be utilized to provide a summary of a user communication that previously occurred. Non-limiting examples of productivity applications or services comprise but are not limited to: presentation program applications/services (e.g., presentation applications/services); collaborative communication applications/services; software development applications/services; word processing applications/services; spreadsheet applications/services; notes/notetaking applications/services; authoring applications/services; presentation broadcasting applications/services; search engine applications/services; email applications/services; messaging applications/services; web browsing applications/services; digital assistant applications/services; webpage building applications/service; directory applications/services; mapping services; calendaring services; electronic payment services; digital data storage or distributed data storage applications/services; web conferencing applications/services; call communication applications/services; language understanding applications/services; bot framework applications/services; networking applications/service; and social networking applications/services, among other examples. In some examples, an exemplary productivity application/service may be a component of a distributed software platform providing a suite of productivity applications/services. A distributed software platform is configured to providing access to a plurality of applications/services, thereby enabling cross-application/service usage to enhance functionality of a specific application/service at run-time. Distributed software platforms may further manage tenant configurations/user accounts to manage access to features, applications/services, etc. as well access to distributed data storage (including user-specific distributed data storage). For example, a user account of a distributed software platform may be utilized to login to an application/service and be associated with a live camera feed. Moreover, specific application or services (including those of a distributed software platform) may be configured to interface with other non-proprietary application or services (e.g., third-party applications/services) to extend functionality including the collection of data pertaining to a user communication and analysis thereof.

As identified above, the application/service component 104 is configured to provide data for user access to an application/service including provision of a GUI for user access to an application/service. For instance, the application/service component 104 is configured to render and provide representations of communication inclusivity data insights, which may be displayed for a user through a GUI of an application/service. The application/service component 104 interfaces with the user computing device(s) 102 to enable provision of an exemplary GUI through the user computing device(s) 102 or display devices connected therewith. Through a GUI of an application or service, representations of communication inclusivity data insights may be provided through any type of GUI element including but not limited to: GUI callouts; banners; notifications; messages; and GUI menus and windows, among other examples. In at least one example, communication inclusivity data insights are provided as in a summary report that summarizes a user communication (e.g., electronic meeting). An exemplary summary report may be provided in real-time (or near real-time) through during a user communication and/or after the completion of a user communication. Examples of data included in summary report comprise but are not limited to: user identification; textual representations of communication inclusivity data insights (e.g., derived from analysis of the stationary distribution); identification of speaking states/ associated transitions between speaking states during a user communication (e.g., in a graphical representation); feedback for users in the form of inclusivity analytics derived from communication inclusivity; statistics associated with conducting of a user communication; and links to content/ entities/users, among other examples. A non-limiting example of a summary report is illustrated in FIG. 3B, where a meeting report of an electronic meeting is displayed.

Applications or services, provided by the application/service component 104, may interface with other components of system diagram 100 to enhance processing efficiency and functionality as described herein. The application/service component 104 is configured to interface with a user computing device(s) 102 as well as the inclusivity detection component 106, the communication inclusivity analysis modeling 108 and knowledge repositories 110 (e.g., of a distributed software platform). In doing so, contextual signal data may be collected and analyzed to enhance processing described herein including the generation of communication inclusivity data insights. Moreover, contextual signal data may be further analyzed to aid with temporal determinations, executed by the application/service component 104 and/or the inclusivity detection component 106, including determining a timing as when to provide representations of communication inclusivity data insights to a user. For instance, signal data associated with one or more of the user, user devices and/or executing applications or services, may be utilized to determine if it is appropriate to automatically surface a representation at a current point in time or wait for a more opportune instance (e.g., after a user has stopped speaking or after the conclusion of the user communication). In additional examples, analysis of contextual signal data may further help yield determinations as the form/format by which representations of communication inclusivity data insights are to be surfaced on behalf of a user. For instance, analysis of user-specific signal data indicating past usage patterns and preferences of the user may provide the inclusivity detection component 106 with intel as to include a representation of a communication inclusivity data insight in an automatic GUI notification, contextual menu, summary report, etc., as well as help determine the modality by which to provide that representation to the user (e.g., directly through the GUI of a service that is used to conduct the user communication, email or message to a user account of the user, save a copy of a summary report to a distributed data storage). Non-limiting examples of signal data that may be collected and analyzed comprises but is not limited to: device-specific signal data collected from operation of one or more user computing devices 102; user-specific signal data collected from specific tenants/user-accounts with respect to access to any of: devices, login to a distributed software platform, applications/services, etc.; and application-specific data collected from usage of applications/services. In further examples, analysis of signal data may comprise identifying correlations and relationships between the different types of signal data, where telemetric analysis may be applied to generate the above identified contextual determinations (including timing determinations). Captured signal data and results of telemetric analysis thereof may be stored or subsequent retrieval via the knowledge repositories 110. It is further noted that any stored (or logged) data is done so in compliance with data privacy laws and regulations.

The inclusivity detection component 106 is one or more components configured for management of communication inclusivity analysis. Management of communication inclusivity analysis is intended to cover any processing operations related to the determination of communication inclusivity for one or more user communications through the generation (and rendering) of representations of communication inclusivity data insights that are presentable through applications or services. As indicated in the foregoing, communication inclusivity is a targeted analysis that collectively evaluates speaking opportunities (provided and taken by users) during a user communication and thought completion during speech associated with the user communication. That is, communication inclusivity is a collective evaluation that assesses whether 1) each participant of a user communication had an opportunity to speak; and 2) whether the participant, while speaking, got to complete their thought. This analysis requires a transitional link where a state of silence by a user occurs directly after a state of active speech by the user. As this level of analysis contemplates more (states) than just active speech by users, the analysis and results generated therefrom are completely different from traditional systems that analyze time spoken by users and subsequently generate analytics from that temporal analysis. For instance, transition between different types of states (e.g., exemplary speaking states) during a user communication makes the analysis of the present disclosure unique.

The inclusivity detection component 106 is configured to define speaking states that may tracked during occurrence of a user communication. Non-limiting examples of a user communication have been provided in the foregoing description. For ease of explanation, the present disclosure may use an electronic meeting of a user communication, but it is to be understood that processing operations of the present disclosure can be applied to any type of user communication. While the term speaking states may appear to imply that a user/participant is actively speaking, the term speaking states is intended to cover any state relative to a user including states where users take action (e.g., actively speaking or providing an indication) as well as states where no action is taken (e.g., state of silence). The term speaking states is fitting because a user is making a conscious choice as to whether to provide an action or refrain from the same and thus its state of mind with each choice that is made. Non-limiting examples of speaking states defined by the inclusivity detection component 106 comprise but are not limited to states of: active user speech; periods of silence; overlapping speakers; icon indication (e.g., hand raises, emojis); questions in corresponding chat windows; combination states (e.g., requests/responses, interruptions, monologues); other contextual signals (e.g., past and/or present signal data including user-specific signal data, device-specific signal data, and/or application-specific signal data); and any combination thereof.

Developers may track any of the above identified speaking states during the occurrence of a user communication. In some examples, developers may set a configuration of a specific subset of speaking states to determine communication inclusivity. One example configuration may be tracking, for a user communication, active speaking states for each user/participant and also tracking periods of silence. Evaluating additional types of speaking states may further enable a more comprehensive analysis to be executed but may also add layers of complexity for modeling. As such, developers, may set varying levels of configurations that can be applied in application-specific scenarios. For instance, if an application or service has latency requirements for provision of analysis results, the inclusivity detection component 106 may be configured to select a configuration that is appropriate to return results in a timely manner that satisfies the latency requirements.

To execute communication inclusivity analysis, the inclusivity detection component 106 is configured to call upon a component that implements communication inclusivity analysis modeling 108. The communication inclusivity analysis modeling 108 executes an exemplary algorithm of the present disclosure that is configured for determining communication inclusivity of a user communication (or communications) and generating communication inclusivity data insights based on the determination of communication inclusivity. The algorithm may be a programmed software module, trained AI processing (e.g., executing one or more deep learning models), or a combination thereof. For ease of explanation, processing of an exemplary algorithm is referred to as communication inclusivity analysis modeling 108, which is intended to cover any of the above identified implementation examples.

The inclusivity detection component 106 applies communication inclusivity analysis modeling 108 to generate a determination of communication inclusivity for a user communication as well as generation of communication inclusivity data insights (and representations thereof). In doing so, multiple different software modules and/or AI models may be applied. In some technical instances, different models may be tasked with execution of different processing tasks. As a non-limiting example, a software module may be programmed to generate a determination of communication inclusivity (e.g., derive a stationary distribution from analysis of a user communication) and separate trained AI models may be applied to generate data insights therefrom. For ease of explanation, specific processing operations may be described as being executed by the inclusivity detection component 106. However, it is to be understood that the communication inclusivity analysis modeling 108 may be configured to automatically execute any processing operations that are described as being executed by the inclusivity detection component 106.

The inclusivity detection component 106 may be configured to execute pre-processing where signal data is collected for analysis (e.g., by the communication inclusivity analysis modeling 108). Prep-processing may comprise but is not limited to: initializing the communication inclusivity analysis modeling 108; setting configurations of the communication inclusivity analysis modeling 108 including specific speaking states and/or application of specific trained modeling; collecting signal data including audio signals associated with participants of a user communication; generating a transcription of a user communication (e.g., corresponding with a transcription service to receive a transcription), among other examples.

Before speaking states of a user communication can be analyzed, the inclusivity detection component 106 is configured to detect signal data from participants of a user communication. Non-limiting examples of signal data have been provided in the foregoing description. A configuration of the subset of speaking states being applied may dictate what specific signal data is being collected and analyzed. In one instance, signal data pertains to user audio signals (or other types of input signals) that provide content during a user communication. It is noted that signal data is not limited to signal data detected directly from an application or service in which a user communication is being conducted. Other types of signal data may be pertinent to collect and analyze regardless if that specific signal data is ultimately used to generate a determination of communication inclusivity. In some cases, signal data collected may be applied when generating communication inclusivity data insights or when generating a representation of the same (or even determining how to surface a representation to a user).

The inclusivity detection component 106 interfaces with the application/service component 104 to detect input signals provided though one or more application/services. In one example, user audio signals are received through an application or service that is used to conduct the user communication. For instance, user audio signals associated with an electronic meeting, provided through a collaborative communication application/service, are received through the collaborative communication application/service. In one example, the application/service component 104 may then propagate the received audio signals to the inclusivity detection component 106 for analysis. In another example, the application/service component 104 may propagate the received audio signals to an audio transcription application/service which generates a transcription of received audio signals. In yet another example, the inclusivity detection component 106 is configured to detect audio signals received through an application/service, for example, through a component configured for interfacing between the inclusivity detection component 106 and an application/service. For instance, the inclusivity detection component 106 may interface with an application/service through an application programming interfaces (API), plugin or the like. This may enable the inclusivity detection component 106 to employ an event listener to capture audio signals that are propagated through audio channels of an application/service. In most technical instances, audio signals for each participant are received through an independent audio channel, enabling the inclusivity detection component 106 to readily identify which audio signals are associated with which participants. This may be especially useful in isolating audio signals of specific users, where a state of a user communication can change in an instance to add/remove users from the user communication. In other technical examples, processing may be required to isolate audio signals for individual participants as known to one skilled in the field of art.

In technical examples where signal data being analyzed is audio signals associated with a user communication, the inclusivity detection component 106 is configured to generate (or request and receive from a transcription service) a transcription of the audio signals associated with each user/participant (e.g., via the independent audio channels) for subsequent processing. For instance, the inclusivity detection component 106 may interface with an application/service configured specifically for transcription generation. A transcription service may generate a transcription of audio signals of a user communication and transmit the transcription to the inclusivity detection component 106 for subsequent analysis. In some alternative examples, the inclusivity detection component 106 may be configured to generate a transcription of a user communication itself without requiring interfacing with any additional applications/services. In any case, transcription generation processing of audio signals is known to one skilled in the field of art.

Once signal data is received and processed, the inclusivity detection component 106 is configured to segment the user communication for analysis of portions of the user communication to determine a speaking state associated therewith. For example, once a transcription of a user communication is generated (or received), the inclusivity detection component 106 is configured to analyze the transcription to discretize the user communication into a sequence of speaking states (e.g., each reflective of a portion of the user communication). As identified in the foregoing, an exemplary algorithm of the present disclosure is configured treats a user communication as a Markov chain, observing a sequence of speaking states as a user communication progresses to completion. Examples of speaking states have been identified in the foregoing description, where developers can set any combination of two or more speaking states as a configuration for evaluating a user communication.

Segmentation of a user communication breaks down the meeting audio into segments or chunks, where signal data of a segment/chunk can then be further analyzed to determine a speaking state associated therewith. Developers can configure an exemplary Markov chain in any order (e.g., first order, second order, third order) without departing from the spirit of the present disclosure. This may depend on whether developers wish to correlate a previous speaking state with a current and/or future speaking speak. In one exemplary configuration, the Markov chain is a first order Markov chain, where a speaking state is determined only based on what is happening at the current point in time (for that segment/chunk). That is, a next speaking state only depends on the current speaking state that is detected.

Determinations as to how a user communication is segmented by the inclusivity detection component 106 may also vary based on developer preferences. For instance, developers may segment a user communication in a variety of manners, where the user communication is discretized by one or more of: time chunks, word boundaries (e.g., words, sentences) or user actions (e.g., detecting indications such as hand raises, entry of input such as emojis or handwritten input, activation/deactivation of a feature provided through an application/service). Until now, developers have mainly considering discretizing a time axis of an electronic meeting to create a Markov chain. However, that need not be the case in the present disclosure. For example, an electronic meeting may be discretized based on words spoken ultimately dividing the meeting into sequence of words spoken by participants. Continuing that example, a state transition probability matrix is constructed by counting who spoke the next word (or sentence) given which user had spoken the previous word (or previous sentence). Similarly, additional speaking states could factor into this type of analysis. For instance, a user communication can be discretized based on the occurrence of a specific user action or signal detected during an electronic meeting. To do so, a transcription of a user communication would be analyzed at word level timestamps or sentence level timestamps in active speech states and correlated with timestamp data (e.g., through application-specific data of an application/service used to execute a user communication) that indicates an occurrence of a user action.

Continuing an example where discretization of a user communication pertains to spoken word, the inclusivity detection component 106 may be configured to interface with a transcription application or service to determine word-specific timestamps or sentence-specific timestamps. In other examples, transcription processing may breakdown a user communication exclusively based on time chunks (time intervals). It is to be recognized that developers may set intervals of time chunks at any time period without departing from the spirit of the present disclosure.

Segmentation of a user communication allows the inclusivity detection component 106 to evaluate specific portions of a user communication as well as the entirety of the user communication. Speaking states associated with one or more portions of the user communication may be identified so that transitions therebetween can be determined. The inclusivity detection component 106 may generate communication inclusivity data insights that are specific to one or more portions of a user communication. In one example, communication inclusivity data insights may be generated and presented that are representative of a part of a user communication (e.g., surfaced in real-time during the occurrence of an electronic meeting). In further examples, communication inclusivity data insights may be generated and presented that are representative of the entirety of the user communication (e.g., summary report provided after the occurrence of an electronic meeting). It is further noted that representations of exemplary summary reports described herein may include communication inclusivity data insights that are representative of a part (one or more portions) of a user communication.

In some technical instances, multiple software modules or trained AI models may be programmed and implemented to aid segmentation/discretization of a user communication. That is, different trained AI models may be specifically configured to each discretize a user communication in a different manner. For example, a first trained AI model (or software module) is configured to discretize a user communication according to spoken utterances (e.g., words, sentences) and a second trained AI model (or software module) is configured to discretize a user communication based on time (e.g., time chunks or time intervals). During real-time (or near real-time) processing of a user communication, time intervals and spoken utterances may be analyzed independently and results may be subsequently correlated to aid generation of communication inclusivity data insights. This may enable communication inclusivity analysis to focus on specific portions of a user communication such as more important (or more active) segments of a user communication as compared with less important (less active) segments. In some technical instances, a third trained AI model may be implemented to execute ranking processing that evaluates a relevance of portions of user communications, for example, based on a correlation of spoken utterances and time chunks. In alternative instances, an additional trained AI model may not be required to execute such processing, where a previously applied trained AI model may be configured to receive results from another trained AI model and generate a relevance processing result (e.g., via a trained softmax layer).

Consider an example where an electronic meeting is being discretized exclusively based on spoken utterances such as sentences spoken during the electronic meeting. In that example, a user communication may be segmented based on the utterance of a completed sentence. For instance, a first sentence is associated with a first speaking state, a second sentence is associated with a second speaking state, etc. Once a sentence is spoken, which triggers a first detected speaking state, speaking states may also be detected for periods of silence (e.g., a silence state). A silence state may be determined to follow the utterance of a sentence by a user/participant of the user communication. In some examples, threshold determinations may be set for word utterance, whereby random sounds/noises/utterances can be filtered out from the analysis of the sequence of speaking states if a threshold is not satisfied. Developers may set evaluation thresholds at any level of word utterance (e.g., multiple words or a completed sentence).

As a user communication progresses, a sequence of speaking states may be generated. The inclusivity detection component 106 may track a count of each speaking state that correspond to the segments (or discretized portions) of the user communication and subsequently analyze transitions between those speaking states. For example, a transcription and/or other signal data may be analyzed, and a count of each speaking state may be determined from curated analysis of data associated with segmentations of the user communication. A pure count of each speaking state may be utilized to generate some data insights that may be presented to a user (e.g., data insights indicating the number of times a speaking state occurred, comparative analysis amongst speaking states, etc.). However, as referenced in the foregoing, a determination of communication inclusivity may be based on analysis of transitions between discretized speaking states. Thus, a count of transitions between each speaking state is derived for the identified speaking states. In doing so, the inclusivity detection component 106 is configured to build a state transition probability matrix that is representative of transitions between speaking states that occurred during the user communication.

A state transition probability matrix is a stochastic matrix that is setup to describe transitions of a Markov chain, where each of its entries is a nonnegative real number representing a probability. A stochastic matrix is a square matrix with all non-negative entries and whose every row sums to one. Generation of transition probability matrices including stochastic matrices are known to one skilled in the field of art. It is to be recognized that any type of stochastic matrix may be generated as known to one skilled in the field of art may be generated without departing from the spirit of the present disclosure. Above what is traditionally known, the state transition probability matrix of the present disclosure is specifically configured to evaluate transitions between speaking states. The state transition probability matrix provides the observed probabilities of what speaking state is to occur after the detection of a specific speaking state. For example, the state transition probability matrix generates observed probabilities of who speaks after who during a user communication. Due to the uniqueness of the speaking states of the present disclosure, communication inclusivity can be derived from analysis as to how often a user may transition between identified speaking states and interactions between users that specifically pertain to identified speaking states.

As a starting point, generating a state transition probability matrix (e.g., a stochastic matrix) that is the first step to determining whether a stationary distribution can be generated for the state transition probability matrix. Proofs may then be applied to prove that a sequence of speaking states of a user communication (and thus the state transition probability matrix thereof) is irreducible and aperiodic. Confirming that a state transition probability matrix is stochastic, irreducible and aperiodic, proves that the meeting has a stationary distribution. In other words, in a long enough meeting with a given transition matrix, the expected time a participant will speak, will follow a unique stationary distribution.

One important speaking state for communication inclusivity determination is a state of silence (silence state). Usage of a state of silence, as a speaking state, can help frame the user communication for communication inclusivity analysis including determining whether states of a user communication are irreducible and aperiodic. A silence state is a critical evaluation point for determining inclusivity of a user communication because it provides a point in the user communication where every participant has the opportunity to speak. Furthermore, a silence state helps segment a user communication, where active speaking states are may be prepended and appended with a silence state to help frame other speaking states (e.g., active speaking state) across participants. As such, a silence state may be set as a focus state that is used to help prove that a sequence of speaking states is irreducible and aperiodic. While one non-limiting example of a focus state is a silence state (state of silence), it is to be understood that developers can set any speaking state as a focus state without departing from the spirit of the present disclosure.

At a high level, the concepts of irreducibility and aperiodicity are used to confirm that the user communication comprises a sequence of states where all speaking state are reachable and one that does not result in a loop that repeats the same states. That is, if you generate the sequence of speaking states infinity, you won't be stuck in a loop that repeats the same state or sequence of states. Mathematical formulae for proving irreducibility and aperiodicity are known to one skilled in the field of art. Above what is traditionally known, the present disclosure, to prove irreducibility and aperiodicity, is configured to specifically manage a state sequence that is comprises exemplary speaking states. This may involve processing that generates (or modifies) portions of that sequence of speaking states before evaluating irreducibility and/or aperiodicity as well as technical instances where an evaluation of a sequence of speaking states yields a determination that a sequence of speaking states does not produce a state transition probability matrix that is irreducible and aperiodic. If a stochastic matrix is irreducible and aperiodic, then it has a unique stationary distribution and the corresponding Markov chain converges to that distribution. With careful construction of a space for speaking states during modeling, the present disclosure can guarantee that a Markov chain for any type of user communication is to be irreducible and aperiodic.

Exemplary proofs described herein may be programmed probabilistic rules that are applied to guarantee that a specific state transition probability matrix can generate a stationary distribution. Programmed probabilistic rules may be utilized to train communication inclusivity analysis modeling 108 so that a stationary distribution can be calculated for evaluating speaking state transitions of a user communication. A proof of irreducibility that is applied is set to confirm that every identified speaking state, used in a configuration for evaluating a user communication, is reachable from every other speaking state with a non-zero probability. In essence, all speaking states communicate with each other and there is a non-zero probability that each speaking state can be reached from another. A proof of aperiodicity is utilized to prove that the speaking states are not partitioned into sets such that all state transitions occur cyclically from one set to another. State transitions do not occur cyclically if it can be proven that at least one transition between speaking states is aperiodic. Therefore, if there is at least one state transition that is aperiodic, it is confirmed that the entire sequence of speaking states is aperiodic. For evaluation of active speech, this means that if at least one speaker speaks for two consecutive indexed segments, the entire meeting is aperiodic. In some technical instances where a proof of aperiodicity is troublesome, developers may discretize a user communication in smaller intervals (e.g., time chunks or words), which may lead to the identification of segmentations that are aperiodic.

As an example, say that there are two participants in a user communication, respectively A & B). An irreducible result would avoid a sequence that has the same state transition repeat forever (i.e., A to A or A to B). A proof of irreducibility is configured to manage a focus state (e.g., a silence state) within a sequence of speaking states helps guarantee that a user communication is irreducible. For example, introduction of a third state (i.e., state C) into a two-participant electronic meeting prevents instances where a sequence of speaking states has a single state transition repeat infinitely. In essence, this guarantees that there is non-zero probability that other speaking states (e.g., A to C, A to B, B to C) can be reached. A proof of aperiodicity is configured to confirm whether there is a transition between speaking states that is aperiodic. With respect to an evaluation of aperiodicity in that two-person user communication, identification of a self-transition (e.g., A to A or B to B) confirms that the transitions between states does not remain periodic (i.e., A to A, A to B; B to A). As such, a proof of aperiodicity may be configured to confirm identification of a state of self-transition within the sequence of speaking states. In many instances, there will be multiple self-transitions to track, especially when a user communication is discretized in smaller intervals (e.g., smaller time chunks of spoken words). However, only one instance of a self-transition may be necessary to prove aperiodicity. In cases where a state of self-transition does not occur, the inclusivity detection component 106 may be configured to amend the sequence of speaking states to include at least one instance of self-transition. For instance, a state of self-transition may be appended to a sequence of speaking states, which does not affect a determination of communication inclusivity for respective speakers.

Continuing a technical instance where the focus state is a silence state (state of silence), the inclusivity detection component 106 is configured to evaluate the identified speaking states to confirm that the user communication comprises a sequence of speaking states that is irreducible. This may comprise a modification to the sequence of speaking states to help guarantee irreducibility. For a user communication, the sequence of speaking states may be prepended and appended with a silence state. Consider an example where an electronic meeting consists of three participants (A, B, C), and where a silence state "S" is utilized to designate periods of silence state during the electronic meeting. The transcribed order of who spoke during the electronic meeting may be something like:

A→B→A→A→S→A→C→C→S→B→B.

To guarantee that the sequence of speaking states is irreducible in any instance, the inclusivity detection component 106 may be configured to generate a proxy sequence that modifies the sequence of speaking states to:

S→A→B→A→A→S→A→C→C→S→B→B→S.

The new sequence identified above is just the original sequence, pre-pended (at the beginning) and appended (at the end) with an S indicating a state of silence. The new sequence of speaking states may then be used to construct the state transition probability matrix. Since the sequence starts and ends at the same speaking state, and goes through every speaking participant (e.g., since we only consider participants who spoke at least once to construct a state probably transition matrix), every state is reachable from every other state with a non-zero probability. Therefore, the probability matrix has a non-zero probability for a given route and irreducibility is proven.

With respect to proving aperiodicity, the proof of aperiodicity is configured to configure that at least one state transition is aperiodic in the sequence of speaking states. This may comprise confirming that a state of self-transition occurs between speaking states as previously discussed. In cases where a state of self-transition does not occur, the inclusivity detection component 106 may be configured to amend the sequence of speaking states to include at least one instance of self-transition. For instance, a state of self-transition may be appended to a sequence of speaking states, which does not affect a determination of communication inclusivity for respective speakers.

Considering the above sequence (proxy sequence), there is at least one instance of self-transition in the above sequence of speaking states, thereby proving that the sequence of speaking states is aperiodic. For instance, there is a first instance of self-transition where a first participant (A) transitioned to itself (A), a second instance of self-transition where a second participant (B) transitioned to itself (B), and a third self-transition where a third participant (C) transitioned to itself. This is possible when the segmentation of the electronic meeting is discretizing the electronic meeting into small time chunks or a by words (e.g., sentences). As such, a state transition probability matrix, being a stochastic matrix, is proven to be irreducible and aperiodic, suggesting that a stationary distribution can be derived.

Furthermore, the present disclosure is configured to also address technical instances of speaker overlap in a novel manner. Speaker overlap occurs where multiple participants are actively speaking at the same time in segmentation of a user communication, which is a common occurrence in user communications such as electronic meetings. Speaking overlap may create confusion when attempting to determine a transition between speaking states. Theoretically, a solution when evaluating speaker overlap is to just add a new speaking state for every multi-speaker combination (e.g., a speaking state having multiple speakers). However, from a practical standpoint, this is more than exponentially inefficient (since for N speakers, we can have up to $2^N$ states and the solution will involve Eigen decomposition of a $2^{2N}$ matrix). The present disclosure avoids this explosion of state space by splitting the speaker overlap into a sequence. When an overlapping speaker state is detected in a segment of a user communication, the inclusivity detection component 106 is configured to execute processing that decomposes a multi-speaker sequence into a series of transitions that fit within the define speaking states for an applied configuration. For example, consider a three-state long sequence: A→ABC→C. Instead of having additional state ABC (e.g., multi-speaker state), that sequence can be decomposed into the following sequence: A→A→C, A→B→C and A→C→C. Those transitions may then be added to the state transition probability matrix.

The inclusivity detection component 106 is then configured to compute the state transition probability matrix based on an evaluation of state transitions between speaking states of a user communication. For example, a final count is determined that identifies the number of transitions between speaking states that are defined in the applied configuration, where the final count identifies the number of times there was a transition from one speaking state to another speaking state when considering the entirety of the user communication (or segments thereof). Processing for generating a transition probability matrix is known to one skilled in the field of art.

Above what is traditionally known, the present disclosure is configured to emphasize the importance of a focus state when generating the state transition probability matrix. This may comprise setting values for a focus state (and transitions related thereto) to reflect one or more aspects of communication inclusivity. For instance, communication inclusivity comprises an evaluation as to whether participants had an opportunity to speak during a user communication as well as what a participant did when provided with an opportunity to speak. In a matrix calculation, it is believed that setting values that reflect aspects of communication inclusivity help derive a stationary distribution that is truly reflective of the definition of communication inclusivity.

Moreover, the present disclosure may further be configured to apply trained AI processing to aid computation of a state transition probability matrix. Through implementation of communication inclusivity analysis modeling 108, the process of generating a state transition probability matrix may be automated, thereby saving time and computational resources. Additionally, trained AI processing may be configured to execute processing operations to automatically set values associate with specific focus states (e.g., silence state) within a state transition probability matrix. Developers can train AI processing to automatically set values for transitions to/from a focus state so that real-time (or near real-time) processing can efficiently generate the state transition probability matrix when a specific configuration is selected.

Continuing an example where a focus state is a silence state, the inclusivity detection component 106, when generating a calculation for the state transition probability matrix, is configured to set values equal for transitions from a silence state by each user/participant. In other words, the value of a transition from the silence state is set equal for each user because all participants have an equal opportunity to begin speaking after an occurrence of a pause (silence). Furthermore, the inclusivity detection component 106, when generating a calculation for the state transition probability matrix, is configured to set a value equal to zero for continuous transitions between silence states (e.g., continuous silence states). This results in transitions from a silence state to a silence state not affecting the stationary distribution because that transition ultimately does not impact user opportunity to speak or thought completion. In examples where the focus state is a different speaking state, similar processing can be applied to configure the state transition probability matrix for optimal evaluation of communication inclusivity.

Furthermore, computation of the state transition probability matrix comprises generation of a probabilistic distributive calculation that is derived for the final count of transitions between respective speaking states. That is, the inclusivity detection analysis component 106 is configured to generate a stationary distribution based on analysis of the state transition probability matrix identifying transitions between speaking states of a user communication (or user communications). In this manner, an exemplary stationary distribution is representative of the coined term "communication inclusivity" as described in the present disclosure. Processing for generating a stationary distribution, including computation thereof, is known to one skilled in the field of art. As an example, processing for generating a stationary distribution of the state transition probability matrix may comprise transposing the state transition probability matrix and then applying an eigenvector function to generate the stationary distribution. Given an irreducible, aperiodic, stochastic matrix M, its stationary distribution is given by the Eigenvector corresponding to Eigenvalue 1+0i of $M^T$. Moreover, the present disclosure may further improve efficiency in calculating a stationary distribution by focusing on a single eigenvector rather than requiring an entire Eigen decomposition. The present disclosure may further be configured to apply trained AI processing to aid generation of a stationary distribution. Through implementation of communication inclusivity analysis modeling 108, the process of calculating a stationary distribution may be automated, thereby saving time and computational resources.

As identified above, a stationary distribution of a Markov chain is a probability distribution that remains unchanged in the Markov chain as time progresses. The stationary distribution of the present disclosure represents a completely different analysis from that of traditional systems which typically determine the amount of time each participant spoke during a meeting (and further generating analytics related to the speaking time of participants). An exemplary stationary distribution is a representation of communication inclusivity in a meeting. As previously identified, communication inclusivity of a user communication is a collective evaluation that assesses whether 1) each participant had an opportunity to speak; and 2) whether the participant, while speaking, got to complete their thought. If this stationary distribution is concentrated at participant A (rather than other participants), it means in a future similar meeting (e.g., (same participants, same agenda) or even in the representation of current meeting in participants' minds, participant A spoke most giving others less chance to state their points. Hence, a determination as to aspects of communication inclusivity can be derived from a generated stationary distribution based on the novel construction of the state transition probability matrix. In short, the state transition probability matrix provides the observed probabilities of who speaks after who during the electronic meeting, and the stationary distribution represents how much time each participant will end up speaking if we were to simulate this meeting multiple times or run a single meeting infinitely.

Once a stationary distribution is computed, the inclusivity detection analysis component 106 is further configured to transform that stationary distribution into a usage metric that is reflective of communication inclusivity. For example, processing operations may be applied, through the communication inclusivity analysis modeling 108, that sets thresholds on percentages of that stationary distribution to evaluate how each user participant faired with respect to determining whether a participant was inclusive or not in the context of a specific user communication. This enables communication inclusivity data insights to be generated from the stationary distribution. A threshold evaluation is applied to indicate what percentage of time a participant is supposed to speak given the context of a specific user communication. When applying a threshold evaluation, if the value in stationary distribution for that participant is greater than the value that participant is supposed to speak, it may be determined that the participant was not being inclusive. If the value in stationary distribution for that participant is less than or equal to than the value participant is supposed to speak, it may be determined that the participant was being inclusive.

A non-limiting example of a threshold evaluation being applied may be as follows. If an electronic meeting has N participants, each participant is supposed to contribute for 100*(1/N) % of the time. As such, if the percentage in stationary distribution for any user is greater than 100*(1/N), a threshold determination may be made that the user is not inclusive. It is noted that a threshold values used in a threshold evaluation may vary to without departing from the spirit of the present disclosure. Similar to other processing executed in the present disclosure, processing for executing a threshold evaluation of a stationary distribution and generation of communication data insights therefrom may be executed automatically through trained AI processing (e.g., as part of the communication inclusivity analysis modeling 108). The inclusivity detection analysis component 106 may be configured to generate a communication inclusivity data insight from a result of that threshold evaluation of the stationary distribution. In some examples, this may comprise output of a specific metric (e.g., percentage of inclusivity) derived from analysis of the stationary distribution.

Moreover, the communication inclusivity analysis modeling 108 is further configured to dive deeper into inclusivity analysis to generate determinations as to any of a plurality of other aspects associated with communication inclusivity. As identified above, communication inclusivity is a targeted analysis that collectively evaluates speaking opportunities (provided and taken by users) during a user communication and thought completion during speech associated with the user communication. In additional to an overall inclusivity evaluation (e.g., for a user or group of users), inclusivity analytics pertaining to a users' thought completion and opportunities provided (and taken) by that user may be generated to help users better understand communication inclusivity. Non-limiting examples of inclusivity analytics comprise but are not limited to: an analytic as to thought completion by a user during a user communication; an analytic pertaining to interruptions by the user during the user communication; an analytic pertaining to interruptions by other users during the user communication; an analytic pertaining to opportunities to speak during the user communication; an analytic pertaining to opportunities to speak that were taken by the user during the user communication; an analytic indicating user monologuing during the user communication; analytics related to speech effectiveness (e.g., pace, use of fillers, pitch) during the user communication, among other examples. Inclusivity analytics may be a quantifiable determination (e.g., numeric value or rank) or a qualitative determination (e.g., good, bad, inclusive/not inclusive, textual summary of the analysis) that is output in a representation of communication inclusivity data insights.

Similar to other processing executed in the present disclosure, processing for executing a generation of communication data insights may be executed automatically through trained AI processing (e.g., as part of the communication inclusivity analysis modeling 108). For example, trained AI processing may be configured to generate inclusivity analytics from analysis of any of the following: the stationary distribution; evaluation of a subset of specific speaking state transitions detected during a user communication; probabilities associated with the state transition probability matrix (including threshold evaluation of speaking states and associated transitions); collected signal data as described herein; or a combination of any of the foregoing. In one example, an inclusivity analytic pertaining to evaluation of the speaking opportunities provided/taken by a user may be derived from analysis of the quantified values associated with the stationary distribution. In another example, an inclusivity analytic for thought completion may be derived from an analysis (e.g., count) of specific state transitions during a user communication such as transitions from a state of active speech (by the user) which transition directly to a state of silence. In further examples, any of the inclusivity analytics generated may further be comparatively evaluated with signal data collected for a user (or other users) from past user communications. This type of analysis may help provide a user with an overall understanding of their communication inclusivity, communication style and effectiveness over one or more user communications.

Trained AI modeling of the communication inclusivity analysis modeling 108 may then be configured to automatically generate communication inclusivity data insights based on any of the inclusivity analytics described in the foregoing. In some examples, specific inclusivity analytics may be output corresponding to a specific type of representation of communication inclusivity data insights that is being generated. For instance, a summary report may have a pre-determined layout of content representative of communication inclusivity, where specific inclusivity analytics may be included therein versus a GUI callout that is tailored to a specific analytical metric.

In other examples, one or more trained AI models (e.g., deep learning models) may be applied that are configured to analyze a relevance of an aspect of communication inclusivity in the form of an inclusivity analytics in order to determine what inclusivity analytics to output. As an example, one or more trained AI models may execute a relevance analysis that applies a classifier trained for evaluating relevance of inclusivity analytics based on metric analysis of one or more aspects of communication inclusivity. The above identified relevance analysis evaluates a significance of an aspect of communication inclusivity based on a comparative evaluation of actual results collected from the user communication versus expected results. A threshold may be set for analyzing an aspect of communication inclusivity based on evaluation of past occurrence patterns for that analytical metric stemming from analysis of previous user communications (e.g., expected results). Depending on the specific inclusivity analytic being evaluated, the expected results may be a specific numerical number or a range that is expected during the occurrence of a user communication. For example, say that a user spoke five times (e.g., five active speaking states) during an electronic meeting but analysis of the sequence of speaking states yielded a determination that the user only completed their thought one out of the five times. This may have occurred possibly because the user was continuously interrupted. The trained AI processing may be configured to understand that, based on past evaluation of occurrence patterns from previous electronic meetings, a user should have completed thoughts in at least four of those five speaking instances. A threshold evaluation may then be conducted to determine whether that actual result (one instance of thought completion) of the electronic meeting matches the predicted outcome (four instances of thought completion). In the example given, the actual results of the user communication did not meet the expected results. This may be a trigger to notify the user via a communication inclusivity data insight. In addition to determining whether a threshold is satisfied or not, the threshold evaluation may further comprise determining how close the actual result is to the expected result so that an analytical metric can be quantified.

Moreover, depending on the inclusivity analytic being evaluated, the threshold evaluation may be set at a specific numerical number (as indicated in the above example) or an acceptable range as determined by developers. As one example, an acceptable range for a threshold evaluation may be reflected in an instance where an inclusivity analytic pertaining to opportunities to speak during a user communication is being evaluated. While opportunities to speak may be judged directly after an occurrence of silence (e.g., a silence state), not all opportunities may be created equal. For instance, there may have been a brief pause while a user took a breath during a long explanation of a complex topic. This may not provide a true opportunity for other users to speak. As such, it may make sense to set an acceptable range pertaining to those speaking opportunities rather than requiring a specific numerical threshold to be satisfied. In any example, one or more inclusivity analytics may be selected and output for inclusion in a representation of a communication inclusivity data insight based on a result of the metric relevance analysis of aspects of communication inclusivity.

Further instances of relevance analysis may attempt to predict the relevance of an inclusivity analytic to a user (or group of users) as part of a relevance evaluation of aspects of communication inclusivity. In some cases, specific inclusivity analytics may be more relevant to specific users or specific users may prefer to receive communication inclusivity data insights that comprise certain inclusivity analytics. An exemplary trained AI model may be configured to implement relevance scoring that scores the relevance of specific inclusivity analytics to a user-specific context. That is, a classifier for an AI model may be trained to score a relevance of an inclusivity analytics based on analysis of user-specific context that may be derived from evaluation of collected signal data, as referenced in the foregoing description, including signal data pertaining to user preferences, user settings, user interactions with applications/services and past usage patterns of users. Inclusivity analytics may be ranked for relevance to a user-specific context, where a number of inclusivity analytics (N number of inclusivity analytics) may be output for inclusion in representations of communication inclusivity data insights based on a threshold evaluation of a relevance score pertaining to the user-specific context. Furthermore, inclusivity analytics may be filtered for inclusion in a representation of a communication inclusivity data insight if the relevance score, pertaining to the user-specific context, exceeds a threshold set for relevance scoring evaluation. In some examples, a user-specific relevance evaluation may be executed in addition to other relevance ranking processing (e.g., a metric analysis of relevance of inclusivity analytic).

Moreover, the inclusivity detection component 106 is configured to generate representations of communication inclusivity data insights for presentation to a user (e.g., through a GUI of an application or service). As referenced in the foregoing description, the present disclosure enables provision of an improved graphical user interface that is configured to render and present novel GUI representations of communication inclusivity data insights. To create representations of communication inclusivity data insights, the inclusivity detection component 106 may call upon an inclusivity detection service that is specifically configured to automatically generate tangible GUI representations from a result of analysis of communication inclusivity across one or more user communications. Through a GUI of an application or service, representations of communication inclusivity data insights may be provided through any type of GUI element including but not limited to: GUI callouts; banners; notifications; messages; and GUI menus and windows, among other examples.

In some examples, the inclusivity detection service may be configured to execute a contextual evaluation to aid generation and/or provision of communication inclusivity data insights. For instance, signal data, as previously described, may be collected and analyzed to provide a full understanding of a current context of a user communication and/or users involved therein. A contextual evaluation may occur at any time including prior to an occurrence of a user communication, during conducting of the user communication or after completion of a user communication. It is to be understood that contextual analysis may be utilized to determine what content to include in a representation of communication inclusivity data insights, a format of a representation of communication inclusivity data insights as well as a timing of when to provide a representation of communication inclusivity data insights.

In some technical instances, an exemplary inclusivity detection service may be programmed to generate pre-configured representations of communication inclusivity data insights as set by developers. For example, developers may pre-configure formatting of representations of communication inclusivity data insights which may include the content presented therein as well as an arrangement of that content. In other examples, an exemplary inclusivity detection service may further be programmed to generate representations of communication inclusivity data insights based on contextual analysis as referenced in the foregoing. This may comprise generation of representations of communication inclusivity data insights based on evaluation of processing results of the various types of relevance analysis previously described including metric relevance analysis and user-specific contextual analysis.

In one example, an inclusivity detection service is configured to generate a GUI notification of a communication inclusivity data insight that provides a user with an indication of its communication inclusivity during a user communication. As previously referenced, a representation of communication inclusivity may be a quantifiable analytic (e.g., a rating or percentage derived from analysis of the stationary distribution), a qualitative analytic (e.g., a textual description summarizing a users' communication inclusivity derived from analysis describe herein) or a combination thereof. A non-limiting example of a GUI notification is illustrated in FIG. 3A and further described in the accompanying description. It is noted that an exemplary GUI notification may be generated to include any aspect of communication inclusivity analysis including inclusivity analytics described in the foregoing description. In another example, a summary report of a user communication may be generated that provides a summary of a user communication. Examples of data included in summary report comprise but are not limited to: user identification; textual representations of communication inclusivity data insights (e.g., derived from analysis of the stationary distribution; identification of speaking states/associated transitions between speaking states during a user communication (e.g., in a graphical representation); feedback for users in the form of inclusivity analytics derived from communication inclusivity; statistics associated with conducting of a user communication; and links to content/entities/users, among other examples. A non-limiting example of a summary report is illustrated in FIG. 3B, where a meeting report of an electronic meeting is displayed.

Furthermore, exemplary communication inclusivity data insights, generated may be tailored for representation as user-specific data insights (e.g., specific to an individual user or comparative with a group of users) and/or group-specific data insights (e.g., specific to a group of users for one or more user communications). In examples where group-specific data insights are provided, the present disclosure may provide data insights that inclusively evaluate a group of users involved in a user communication and/or data insights comparatively evaluating a group of users involved in a user communication with one or more other groups of users (e.g., associated with another user communication). Non-limiting examples of GUI representations of the present disclosure are provided in FIGS. 3A and 3B. In some technical instances, representations of communication inclusivity data insights may have multiple views (e.g., user-specific view and group-specific view), where GUI elements may be provided therewith to enable users to toggle between different views.

Additionally, the inclusivity detection component 106 may interface with the inclusivity detection service to store representations of communication inclusivity data insights. In some examples, representations of communication inclusivity data insights may be generated and immediately propagated for rendering through a GUI of an application/service. In other examples, representations of communication inclusivity data insights may be generated, stored and then recalled for presentation. In any example, representations of communication inclusivity data insights may be stored on a distributed data storage (e.g., knowledge repositories 110) for recall and rendering through a GUI of an application/service.

As referenced in the foregoing description, the communication inclusivity analysis modeling 108 may comprise implementation of trained AI processing. Execution of processing related to the management of AI modeling (e.g., building, training, implementing, updating) are known to one skilled in the field of art. Trained AI processing may be applicable to aid any type of determinative or predictive processing including specific processing operations described about with respect to determinations, classification ranking/scoring and relevance ranking/scoring. This may occur via any of: supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM) neural networks (e.g., deep neural network (DNN) convolutional neural network (CNN) or recurrent neural network (RNN)); and transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. Furthermore, trained AI processing may be continuously updated over time including based on receipt of user feedback regarding representations of communication inclusivity data insights.

Knowledge repositories 110 may be accessed to obtain data for generation, training and implementation of the communication inclusivity analysis modeling 108 as well the operation of processing operations by that of the application/service component 104 and the communication inclusivity detection component 106. Knowledge resources comprise any data affiliated with a software application platform (e.g., Microsoft®, Google®, Apple®, IBM®) as well as data that is obtained through interfacing with resources over a network connection including third-party applications/services. Knowledge repositories 110 may be resources accessible in a distributed manner via network connection that may store data usable to improve processing operations executed by the communication inclusivity detection component 106 and/or the communication inclusivity analysis modeling 108. Knowledge repositories 110 may be data stored on a distributed data storage that is accessible over a network connection. However, in some examples, data described with respect to knowledge repositories 110 may be stored locally on a computing device. Examples of data maintained by knowledge repositories 110 comprises but is not limited to: collected signal data (e.g., from usage of an application/service, device-specific, user-specific); telemetry data including past usage of a specific user and/or group of users; corpuses of annotated data used to build and train AI processing classifiers for trained relevance modeling; access to entity databases and/or other network graph databases; web-based resources including any data accessible via network connection including data stored via distributed data storage; trained bots including those for natural language understanding; data for stored representations of communication inclusivity data insights; and application/service data (e.g., data of applications/services managed by the application/service component 104) for execution of specific applications/services including electronic document metadata, among other examples. Moreover, knowledge repositories 110 may further comprise access to a cloud-assistance service that is configured to extend language understanding processing including user context analysis. The cloud-assistance service may provide the communication inclusivity detection component 106 and/or application/service component 104 with access to larger and more robust library of stored data for execution of language understanding/natural language understanding processing including transcribing audio signals received from users/participants of a user communication. Access to the cloud-assistance service may be provided when an application/service is accessing content in a distributed service-based example (e.g., a user is utilizing a network connection to access an application/service), as the data of the cloud-assistance service may be too large to store locally. In further examples, the communication inclusivity detection component 106 may be configurable to interface with a web search service, entity relationship databases, etc., to extend a corpus of data to make the most informed decisions when generating determinations related to communication inclusivity. In further examples, telemetry data may be collected, aggregated and correlated (e.g., by an interfacing application/service) to further provide components of system diagram 100 with on-demand access to telemetry data which can aid determinations generated thereby including generation of communication inclusivity data insights.

FIG. 2 illustrates an exemplary method 200 related to generation and provision of communication inclusivity data insights for participants of a user communication, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Non-limiting examples of components for operations of processing operations in method 200 are described in system diagram 100 (FIG. 1). Processing operations performed in method 200 may correspond to operations executed by a system and/or service that execute computer modules/programs, software agents, APIs, plugins, AI processing including application of trained data models, intelligent bots, deep learning modeling including neural networks, transformers and/or other types of machine-learning processing, among other examples. In one non-limiting example, processing operations described in method 200 may be executed by a component such as the inclusivity detection component 106 (of FIG. 1) and/or the communication inclusivity analysis modeling 108 (FIG. 1). In distributed examples, processing operations described in method 200 may be implemented by one or more components connected over a distributed network. For example, components may be executed on one or more network-enabled computing devices, connected over a distributed network, that enable access to user communications.

Method 200 begins at processing operation 202, where signal data is detected from participants during a user communication. Examples of user communications have been described in the foregoing description. In one technical instance, a user communication is an electronic meeting that comprises two or more participants/users collaboratively interacting. Examples of signal data associated with users, devices and applications/services, etc., and detection thereof has been described in the foregoing description including the description of system diagram 100 (FIG. 1). In one example, processing operation 202 comprise detection and analysis of audio signals pertaining to specific participants/users that are involved in a user communication such as an electronic meeting. In some instances, processing operation 202 may comprise isolating specific audio channels associated with individual participants involved in a user communication. For example, user audio signals associated with participants in a user communication may be detected through an application or service (e.g., collaborative communication application/service) that is used to host a user communication.

As referenced in the foregoing description, it is to be understood that signal data collected and analyzed is not limited to signal data that is associated with an application or service that is hosting the user communication. Other types of signal data, as previously described, may be collected and analyzed to provide a full understanding of a current context of a user communication and/or users involved therein. A contextual evaluation may occur at any time including prior to an occurrence of a user communication, during conducting of the user communication or after completion of a user communication. It is to be understood that contextual analysis may be utilized to determine what content to include in a representation of communication inclusivity data insights, a format of a representation of communication inclusivity data insights as well as a timing of when to provide a representation of communication inclusivity data insights.

Flow may proceed to processing operation 204. At processing operation 204, a transcription may be generated from analysis of user audio signals (e.g., audio signals pertaining to specific participants/users that are involved in a user communication) that are detected during an occurrence of the user communication. Processing for generating a transcription of exemplary audio signals has been described in the foregoing description including the description of system diagram 100 (FIG. 1). In at least one example, user audio signals are detected and propagated to a transcription application or service, that subsequently generates a transcription of the user audio signals and returns the same to a component (e.g., inclusivity detection component 106 of FIG. 1) for subsequent analysis. A component such as the inclusivity detection component 106 of FIG. 1 (and/or the communication inclusivity analysis modeling 108) may then receive the transcription for communication inclusivity analysis. In alternative examples where a user communication is being conducted through another medium other than audio (e.g., through messaging, email, handwritten input, GUI indications), signal data associated there with may be collected and analyzed. In some technical instances, this may still comprise generation of a transcription of user interactions including communication between participants of a user communication through alternative mediums.

Once signal data is analyzed, including generation of a transcription of a user communication, flow of method 200 may proceed to processing operation 206. At processing operation 206, occurrences of speaking states for a user communication are determined. Non-limiting examples of speaking states defined by the inclusivity detection component 106 comprise but are not limited to states of: active user speech; periods of silence; overlapping speakers; icon indication (e.g., hand raises, emojis); questions in corresponding chat windows; combination states (e.g., requests/responses, interruptions, monologues); other contextual signals (e.g., past and/or present signal data including user-specific signal data, device-specific signal data, and/or application-specific signal data); and any combination thereof. In an example where a user communication is an electronic meeting, determination (processing operation 206) of occurrences of speaking states during an electronic meeting may occur based on analysis of a transcription of user audio signals associated with the electronic meeting. For example, a plurality of speaking states may be identified based on analysis of the transcription of user audio signals associated with the electronic meeting.

While a configuration of the present disclosure may evaluate any of the above identified speaking states, one specific technical example may comprise that where active speaking states and silence states amongst participants are analyzed. Consider an example where an electronic meeting comprises at least two participants communicating over audio channels associated with an electronic meeting. A first state associated with active speech of a first user during the electronic meeting may be analyzed to determine occurrences where the first user actively spoke during the electronic meeting. A second state associated with active speech of a second user during the electronic meeting may be analyzed to determine occurrences where the second user actively spoke during the electronic meeting. Occurrences of a third state indicating a state of silence between the first user and the second user may further be detected and analyzed.

Furthermore, as described in the foregoing, analysis of occurrences of speaking states associated with a user communication may comprise segmenting a user communication and evaluating respective segments. Examples as to how a user communication may be segmented have been described in the foregoing description. In one example, determination (processing operation 206) of occurrences of the plurality of speaking states during the electronic meeting comprises segmenting the transcription into words or sentences. In an example where a user communication is segmented into sentence portions, processing operation 206 comprises analyzing whether the first state or the second state is associated with each of the sentences, and determining whether the third state immediately followed a speaking of each of the sentences. In another example, segmentation of a user communication may comprise segmenting the transcription into time chunks of a predetermined time interval. In an example where the transcription is segmented in time chunks, processing operation 206 may comprise analyzing whether the first state or the second state is associated with each of the time chunks, and determining whether the third state immediately followed user speech associated with each of the time chunks.

Moreover, as indicated in the foregoing description, one or more focus states be selected and used to evaluate transitions between speaking states. Developers may set a focus state for speaking states with an emphasis on determining communication inclusivity. As an example, a silence state may be set as a focus state, where a sequence of speaking states associated with a user communication may be amended/modified to confirm that a stationary distribution can be calculated from analysis of speaking states of a user communication. For instance, a sequence of speaking states may be determined for the user communication, where that sequence of speaking states may be amended/modified to confirm that the sequence of speaking states is irreducible and aperiodic. Processing for applying proofs of irreducibility and aperiodicity have been described in the foregoing description including the description of system diagram 100 (FIG. 1).

Once the speaking states have been identified for a user communication, flow of method 200 may proceed to processing operation 208. At processing operation 208, transitions between identified speaking states may be analyzed to determine a count for transitions between speaking states, where a speaking state transition count may be updated for the user communication. A speaking state transition count may be analyzed in real-time (or near real-time), where transitions between identified speaking states may be counted. After a user communication begins, a speaking state transition count may be continuously updated throughout the duration of the user communication. Thus, the speaking state transition count is determined at a current point in the user communication in cases where a user communication is actively continuing. In some alternative instances, the speaking state transition count may be determined after a user communication has been concluded, where a transcript may be analyzed for the entirety of a completed user communication. Continuing the example described above with respect to a two-participant user communication (e.g., having at least 3 speaking states), processing operation 208 may comprise generating a count of transitions from: the first state to the first state; the first state to the second state; the first state to the third state, the second state to the first state, the second state to the second state, the second state to the third state, and the third state to the third state.

After a speaking state transition count has been updated for a current state of a user communication, method 200 may proceed to decision operation 210, where it is determined if a user communication has ended. In examples where the user communication is continuing, flow of decision operation 210 branches "NO" and processing of method 200 returns back to processing operation 202, where additional signal data is detected and analyzed. This may ultimately result in a subsequent update of the speaking state transition count. In examples, where it is determined that a user communication has ended, flow of decision operation 210 branches "YES" and processing of method 200 proceeds to processing operation 212.

At processing operation 212, a state transition probability matrix is generated that reflects final transition counts for transitions between identified speaking states. Processing for generation of a state transition probability matrix has been described in the foregoing description including the description of state diagram 100 (FIG. 1). Processing operation 212 may comprise generating a state transition probability matrix for transitions between speaking states identified from a sequence of speaking states associated with the user communication. As indicated in the foregoing description, one or more focus states be selected and used to evaluate transitions between speaking states. Continuing the above-described example where a two-participant user communication is being conducted, processing operation 212 may comprise configuring the state transition probability matrix to reflect an emphasis on a specific focus state, which may be utilized to aid determination of communication inclusivity. As previously described, this may comprise amending a sequence of speaking states determined for the user communication. Additionally, values associated with the state transition probability matrix may further be configured for deriving aspects of communication inclusivity. In one example, a focus state may be a silence state (e.g., third state). The state transition probability matrix may be configured according to that focus state so that communication inclusivity can be properly determined. For instance, processing operation 212 comprises: setting, in the state transition probability matrix, a value of a transition from the third state (e.g., silence state) equal when transitioning to other speaking states, and setting a value continuous instances of silence (e.g., a third state) equal to zero.

Flow of method 200 may then proceed to processing operation 214. At processing operation 214, a stationary distribution is generated for the state transition probability matrix. Processing for generation of a stationary distribution has been described in the foregoing description including the description of state diagram 100 (FIG. 1). As indicated in the foregoing description, the way in which the state transition probability matrix is uniquely configured for deriving communication inclusivity results in a unique stationary distribution that reflects overall communication inclusivity for participants of a user communication.

At processing operation 216, one or more communication inclusivity data insights (e.g., meeting inclusivity data insights) may be generated based on a result of analyzing the transitions between the plurality of speaking states for user communication (e.g., an electronic meeting). Processing operations for generation of communication inclusivity data insights has been provided in the foregoing description. As referenced in the foregoing description, a communication inclusivity data insight may be generated based on analysis of the stationary distribution calculated for a user communication. As an example, processing for generation of a meeting inclusivity data insight is an automated process that occurs directly based on analysis of values of the stationary distribution. As further referenced in the foregoing, a communication inclusivity data insight (e.g., meeting inclusivity data insight) may comprise a metric representation of a users' inclusivity during a user communication and/or a textual representation derived from analysis of the stationary distribution (e.g., relative to communication inclusivity patterns derived from other instances of user communications). In further examples, communication inclusivity data insights may be generated with respect to any aspect of communication inclusivity (e.g., inclusivity analytics) for one or more user communications. Further, communication inclusivity data insights may be user-specific, group-specific (e.g., a group of users) or a combination thereof.

In one example, processing operation 216 comprises generating a summary report for a user communication (e.g., an electronic meeting) that is presentable in a graphical user interface of a productivity service. Non-limiting examples of content provided in an exemplary summary report has been described in the foregoing description. For instance, in an example where a summary report is for an electronic meeting, the summary report may comprise a meeting inclusivity data insight and a visual mapping identifying the occurrences of the plurality of speaking states during the electronic meeting. In further examples, processing operation 216 may comprise generating user-specific inclusivity analytics for an individual user based on analysis of the transitions between the plurality of speaking states for the electronic meeting. For instance, user-specific inclusivity analytics comprise a first inclusivity analytic indicating a user opportunity to speak during the electronic meeting, and a second inclusivity analytic indicating whether the individual user completed their thoughts when speaking during the electronic meeting. Further examples of inclusivity analytics that may be included in a notification of a communication inclusivity data insight are described in the foregoing with reference to inclusivity analytics.

Flow of method 200 may then proceed to processing operation 218. At processing operation 218, a representation of communication inclusivity data insights is generated. Processing operations related to generation of a representation of communication inclusivity data insights has been described in the foregoing description including the description of system diagram 100 (FIG. 1).

At processing operation 220, data for rendering of a representation of communication inclusivity data insights is transmitted to a client computing device. As an example, a client computing device may be executing a productivity service and will ultimately render the representation of the communication inclusivity data insights in a GUI of the productivity service. Once data is received at the client computing device, flow of method 200 proceeds to processing operation 222, where a representation of a communication inclusivity data insight is rendered in a GUI of the productivity service.

Further processing of method 200 relates to management of user interaction with a representation of communication inclusivity data insights that is provided through a GUI of a productivity service. For instance, flow of method 200 may proceed to decision operation 224, where it is determined whether a GUI interaction is received with content of an exemplary representation. In examples where no GUI interaction is received, flow of decision operation 224 branches "NO" and processing of method 200 ends. In examples where a GUI interaction is received, flow of decision operation 224 branches "YES" and processing of method 200 returns to processing operation 222, where presentation of an exemplary representation may be updated. In some examples, this may comprise providing a different view (e.g., user-specific view or group-specific view) for a representation of communication inclusivity data insights. In other examples, this may comprise providing a completely different representation.

FIGS. 3A-3B illustrate exemplary processing device views associated with user interface examples for an improved user interface that is configured to enable provision of representations of communication inclusivity data insights, with which aspects of the present disclosure may be practiced. FIGS. 3A-3B provide non-limiting front-end examples of processing described in the foregoing including system diagram 100 (FIG. 1) and method 200 (FIG. 2).

FIG. 3A presents processing device view 300, illustrating a GUI of a collaborative communication application or service (e.g., MICROSOFT® TEAMS®) that is configured to enable users to engage in a user communication. In the example shown in processing device view 300, the GUI, of the collaborative communication application or service, displays representation 302 providing a GUI tab 304 ("Meeting Notes") that provides personalized meeting insights for a user account 306 ("User 2") associated with an electronic meeting ("Sales Meeting"). An exemplary representation 302 may be provided at any time proximate to the occurrence of the electronic meeting including prior to, during or afterwards. In the present example shown in processing device view 300, the electronic meeting ("Sales Meeting") has just concluded. Within the GUI tab 304, a GUI notification 308 is automatically provided notifying the user account 306 of its communication inclusivity during the electronic meeting.

The GUI notification 308 illustrates a variety of manners in which communication inclusivity data insights of the present disclosure may be presented to users. GUI notification 308 may be automatically provided for a user based on results of processing described herein without requiring user request for communication inclusivity feedback. Any type of communication inclusivity data insight may be provided in GUI notification 308. For instance, GUI notification 308 may comprise a quantitative representation of a users' communication inclusivity (e.g., 43%) is provided for the user account 306. In alternative examples, a quantitative representation of communication inclusivity may also be a rating (e.g., letter grade, scaled numerical representation (1-10)). Furthermore, the GUI notification 308 may provide a qualitative representation of a users' communication inclusivity (e.g., textual summary providing adjectives describing communication inclusivity and various aspects associated with communication inclusivity). Additionally, GUI notification 308 may further comprise rich data objects (e.g., links, user contact data, etc.) that may comprise links to GUI menus providing additional representations of communication inclusivity data insights. For instance, GUI notification 308 comprises a link to an additional GUI tab ("Analytics") associated with the collaborative communication application or service, which provides additional representation of communication inclusivity data insights.

FIG. 3B presents processing device view 320, illustrating a continued example of the representation 302 that is shown in processing device view 300 (FIG. 3A). The example shown in processing device view 320 illustrates a representation 322 of the additional GUI tab 324 ("Analytics"), which may have been accessed through selection of the link provided in GUI notification 308 (FIG. 3A). Of course, that is not the only way to access GUI tab 324 whereby a user may take a more direct approach by selecting a tab associated therewith from a GUI menu provided through the collaborative communication application or service, among other manners in which to access GUI tab 324. Representation 322 provides a non-limiting example of a summary report 326 for a user communication as previously described in the foregoing description. An exemplary summary report 326 shown in processing device view 320 provides summary information for a completed electronic meeting ("Sales Meeting").

Examples of data included in summary report 326 comprise but are not limited to: user identification; textual representations of communication inclusivity data insights (e.g., derived from analysis of the stationary distribution); identification of speaking states/associated transitions between speaking states during a user communication (e.g., in a graphical representation); feedback for users in the form of inclusivity analytics derived from communication inclusivity; statistics associated with conducting of a user communication; and links to content/entities/users, among other examples. For instance, summary report 326 provides a qualitative representation of a users' communication inclusivity. Additionally, summary report 326 provides explicit meeting inclusivity feedback on specific aspects of communication inclusivity in the form of inclusivity analytics 328 as well as identification of speaking state transitions 330 during the electronic meeting. As an example, identification of the speaking state transitions 330 may comprise identification of a focus state (e.g., silence state), which is critical to determining communication inclusivity amongst users.

Non-Limiting Examples to Aid Understanding of Determination of Communication Inclusivity Non-Limiting Example 1

Consider a ten-second-long, 2 participant meeting. Let us discretize the time axis into 1 second time chunks and let our speaking states be:
  A: Participant A spoke
  B: Participant B spoke
  C: Silence (from which probability of going to either A or
     B is equal)
Now consider the following meetings where participant A speaks for 70% of the time:
Meeting 1 (e.g., instance where participant B likely agreeing with participant A), having a sequence of speaking states as follows:
  A→A→B→A→B→A→A→B→A→A→C
We can calculate the state transition probability matrix as:

|   | A   | B   | C   |
|---|-----|-----|-----|
| A | 3/7 | 3/7 | 1/7 |
| B | 1   | 0   | 0   |
| C | 1/2 | 1/2 | 0   |

This matrix has a stationary distribution: [0.6, 0.3, 0.1], which means eventually, participant A will speak more than B but not a clear monologue on the part of participant A.

Non-Limiting Example 2

Meeting 2 (e.g., more like both participants being able to state their points) having a sequence of speaking states of:
  B→B→B→A→A→A→A→A→A→A→C
We can calculate the state transition probability matrix as:

|   | A   | B   | C   |
|---|-----|-----|-----|
| A | 6/7 | 0   | 1/7 |
| B | 1/3 | 2/3 | 0   |
| C | ½   | 1/2 | 0   |

This matrix has a stationary distribution: [0.75, 0.15, 0.1], which means eventually, participant A is speaking most and clearly a monologue. Note that there is no silence (state C) between transition from participant B to participant A which means participant B likely did not complete their thought.

Non-Limiting Example 3

Meeting 3 (e.g., an example where participants both get to complete their thoughts) having a sequence of speaking states of:

A→A→A→A→A→A→A→B→B→B→C

We can calculate the state transition probability matrix as:

|   | A   | B   | C   |
|---|-----|-----|-----|
| A | 6/7 | 1/7 | 0   |
| B | 0   | 2/3 | 1/3 |
| C | ½   | 1/2 | 0   |

This matrix has a stationary distribution: [0.5, 0.4, 0.1], meaning eventually, both participants are almost equally speaking on the topic. Note that in all meetings, percentage of time participant A spoke was the same i.e. 70%. But the subjective feeling of participant A's inclusiveness could be different for participant B because in meeting 1, participant B could interrupt. In meeting 3, participant B got to complete their point but in meeting 2, it is more likely participant A took over the meeting without letting participant B get closure (note the lack of silence between transition from B to A).

Non-Limiting Example 4

Meeting 4 (e.g., more like fight between participants) having a sequence of speaking states of:

A→B→A→B→A→B→A→B→A→B→C

We can calculate the state transition probability matrix as:

|   | A   | B   | C   |
|---|-----|-----|-----|
| A | 1/2 | 1/3 | 1/6 |
| B | 1/2 | 1/2 | 0   |
| C | 1/2 | 1/2 | 0   |

This Matrix has a Stationary Distribution: [0.43, 0.47, 0.1], which Means Eventually, Both Will Get to speak equally.

FIG. 4 illustrates a computing system 401 suitable for implementing processing operations described herein related to automatic generation and provision of communication inclusivity data insights, with which aspects of the present disclosure may be practiced. As referenced above, computing system 401 may be configured to implement processing operations of any component described herein including exemplary inclusivity detection component(s) previously described (e.g., inclusivity detection component(s) 106 of FIG. 1). As such, computing system 401 may be configured as a specific purpose computing device that executes specific processing operations to solve the technical problems described herein including those pertaining to generation of more useful data insights that enhance application/service experience and provide feedback to users as to their communication style. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 402 loads and executes software 405 from storage system 403. Software 405 includes one or more software components (e.g., 406a and 406b) that are configured to enable functionality described herein. In some examples, computing system 401 may be connected to other computing devices (e.g., display device, audio devices, servers, mobile/remote devices, VR devices, AR devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1), method 200 (FIG. 2) and/or the accompanying description of FIGS. 3A-3B.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices, VR devices, AR devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing one or more inclusivity detection component(s) 406*a* as described herein. Software 405 may further comprise application/service component(s) 406*b* that provide applications/services as described in the foregoing description such as applications/services that enable access to representations of formatted templates including slide-based presentation applications/services, among other examples.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: communication inclusivity data insights; notifications of communication inclusivity data insights; contextual representations (e.g., user-specific and/or communication-specific) of communication inclusivity data insights including contextually relevant inclusivity metrics and analysis (e.g., user-specific); GUI elements for provision and management of access to communication inclusivity data insights; GUI elements for storing and/or sharing communication inclusivity data insights, among other examples. User interface system 409 comprises a graphical user interface that presents graphical user interface elements representative of any point in the processing described in the foregoing description including processing operations described in system diagram 100 (FIG. 1), method 200 (FIG. 2) and front-end representations related to the description of FIGS. 3A-3B. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output, handwritten input) in conjunction with operation of exemplary applications/services (e.g., a collaborative communication application/service, electronic meeting application/service, etc.) described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
   generating a transcription of audio signals from participants during an electronic meeting;
   determining occurrences of a plurality of speaking states during the electronic meeting based on analysis of the transcription, wherein:
      the plurality of speaking states comprises:
         a first state associated with active speech of a first user during the electronic meeting;
         a second state associated with active speech of a second user during the electronic meeting; and
         a third state indicating a state of silence between the first user and the second user, and
      the determining the occurrences of the plurality of speaking states comprises:
         segmenting the transcription into sentences;
         analyzing whether the first state or the second state is associated with each of the sentences; and
         determining whether the third state immediately followed a speaking of each of the sentences;
   analyzing transitions between the plurality of speaking states for the electronic meeting based on analysis of the occurrences of the plurality of speaking states during the electronic meeting, wherein the analyzing the transitions between the plurality of speaking states comprises generating a count of transitions from:
      the first state to the first state,
      the first state to the second state,
      the first state to the third state,
      the second state to the first state,
      the second state to the second state,
      the second state to the third state, and
      the third state to the third state;
   generating a meeting inclusivity data insight based on a result of analyzing the transitions between the plurality of speaking states for the electronic meeting; and
   transmitting, to a client computing device executing a productivity service, data for rendering of the meeting inclusivity data insight in the productivity service.

2. The computer-implemented method of claim 1, wherein the analyzing of transitions between the plurality of speaking states for the electronic meeting further comprises:
   generating a state transition probability matrix for the count of transitions, and wherein the generating of the state transition probability matrix comprises:
      setting, in the state transition probability matrix, a value of a transition from the third state equal when transitioning to one of the first state and the second state.

3. The computer-implemented method of claim 2, further comprising:

generating a stationary distribution of the state transition probability matrix, wherein the generating of the meeting inclusivity data insight is an automated process that occurs based on analysis of values of the stationary distribution.

4. The computer-implemented method of claim 1, wherein the generating of the meeting inclusivity data insight comprises generating user-specific inclusivity analytics for an individual user based on analysis of the transitions between the plurality of speaking states for the electronic meeting, and wherein the user-specific inclusivity analytics comprise a first inclusivity analytic indicating a user opportunity to speak during the electronic meeting, and a second inclusivity analytic indicating whether the individual user completed their thoughts when speaking during the electronic meeting.

5. The computer-implemented method of claim 1, further comprising: generating a summary report for the electronic meeting that is presentable in a graphical user interface of the productivity service, wherein the summary report comprises: the meeting inclusivity data insight and a visual mapping identifying the occurrences of the plurality of speaking states during the electronic meeting.

6. A system comprising:
at least one processor; and
a memory, operatively connected with the at least one processor, storing computer-executable instructions that, when executed by the at least one processor, causes the at least one processor to execute a method that comprises:
generating a transcription of audio signals from participants during an electronic meeting;
determining occurrences of a plurality of speaking states during the electronic meeting based on analysis of the transcription, wherein:
the plurality of speaking states comprises:
a first state associated with active speech of a first user during the electronic meeting,
a second state associated with active speech of a second user during the electronic meeting, and
a third state indicating silence between the first user and the second user; and
the determining the occurrences of the plurality of speaking states comprises:
segmenting the transcription into sentences,
analyzing whether the first state or the second state is associated with each of the sentences, and
determining whether the third state immediately followed a speaking of each of the sentences;
analyzing transitions between the plurality of speaking states for the electronic meeting based on analysis of the occurrences of the plurality of speaking states during the electronic meeting, wherein the analyzing the transitions between the plurality of speaking states comprises generating a count of transitions from:
the first state to the first state,
the first state to the second state,
the first state to the third state,
the second state to the first state,
the second state to the second state,
the second state to the third state, and
the third state to the third state;
generating a meeting inclusivity data insight based on a result of analyzing the transitions between the plurality of speaking states for the electronic meeting; and transmitting, to a client computing device executing a productivity service, data for rendering of the meeting inclusivity data insight in the productivity service.

7. The system of claim 6, wherein the analyzing of transitions between the plurality of speaking states for the electronic meeting further comprises:
generating a state transition probability matrix for the count of transitions, and wherein
the generating of the state transition probability matrix comprises:
setting, in the state transition probability matrix, a value of a transition from the third state equal when transitioning to one of the first state and the second state.

8. The system of claim 7, wherein the method, executed by the at least one processor, further comprises:
generating a stationary distribution of the state transition probability matrix, wherein the generating of the meeting inclusivity data insight is an automated process that occurs based on analysis of values of the stationary distribution.

9. The system of claim 6, wherein the generating of the meeting inclusivity data insight comprises generating user-specific inclusivity analytics for an individual user based on analysis of the transitions between the plurality of speaking states for the electronic meeting, and wherein the user-specific inclusivity analytics comprise a first inclusivity analytic indicating a user opportunity to speak during the electronic meeting, and a second inclusivity analytic indicating whether the individual user completed their thoughts when speaking during the electronic meeting.

10. The system of claim 6, wherein the method, executed by the at least one processor, further comprises: generating a summary report for the electronic meeting that is presentable in a graphical user interface of the productivity service, wherein the summary report comprises: the meeting inclusivity data insight and a visual mapping identifying the occurrences of the plurality of speaking states during the electronic meeting.

11. A computer-implemented method comprising:
generating a transcription of audio signals from participants during an electronic meeting;
determining occurrences of a plurality of speaking states during the electronic meeting based on analysis of the transcription, wherein:
the plurality of speaking states comprises:
a first state associated with active speech of a first user during the electronic meeting;
a second state associated with active speech of a second user during the electronic meeting; and
a third state indicating silence between the first user and the second user, and
the determining the occurrences of the plurality of speaking states comprises:
segmenting the transcription into sentences;
analyzing whether the first state or the second state is associated with each of the sentences; and
determining whether the third state immediately followed a speaking of each of the sentences;
analyzing transitions between the plurality of speaking states for the electronic meeting based on analysis of the occurrences of the plurality of speaking states during the electronic meeting, wherein the analyzing the transitions between the plurality of speaking states comprises generating a count of transitions from:
the first state to the first state, the first state to the second state,
the first state to the third state,
the second state to the first state,
the second state to the second state,
the second state to the third state, and
the third state to the third state;
generating a meeting inclusivity data insight based on a result of analyzing the transitions between the plurality of speaking states for the electronic meeting; and
rendering the meeting inclusivity data insight in a graphical user interface (GUI) of a productivity service.

12. The computer-implemented method of claim 11, wherein the rendering of the meeting inclusivity metric comprises automatically presenting, in the GUI of the productivity service, a GUI notification that provides a textual representation of the meeting inclusivity data insight.

* * * * *